United States Patent [19]

Seita et al.

[11] Patent Number: 5,139,529
[45] Date of Patent: * Aug. 18, 1992

[54] POROUS POLYPROPYLENE MEMBRANE AND METHODS FOR PRODUCTION THEREOF

[75] Inventors: Yukio Seita; Shoichi Nagaki; Ken Tatebe, all of Fuji; Kousuke Kido, Fukuoka, all of Japan

[73] Assignee: Terumo Kabushiki Kaisha, Tokyo, Japan

[*] Notice: The portion of the term of this patent subsequent to Feb. 13, 2007 has been disclaimed.

[21] Appl. No.: 392,988
[22] PCT Filed: Jan. 20, 1988
[86] PCT No.: PCT/JP88/00039
§ 371 Date: Aug. 25, 1989
§ 102(e) Date: May 25, 1989
[87] PCT Pub. No.: WO88/05475
PCT Pub. Date: Jul. 28, 1988

[30] Foreign Application Priority Data

Jan. 20, 1987 [JP] Japan .................................. 62-8982
Mar. 13, 1987 [JP] Japan .................................. 62-56728

[51] Int. Cl.$^5$ ................................................. A61F 2/54
[52] U.S. Cl. .......................................... 623/66; 623/11; A61F/2/54
[58] Field of Search ...................... 210/500.21, 500.23, 210/500.27, 500.36; 264/41; 623/12, 66, 1

[56] References Cited

U.S. PATENT DOCUMENTS 4,405,688 9/1983 Lowery et al. .
4,708,800 11/1987 Ichikawa et al. .......... 210/500.36 X
4,770,852 9/1988 Takahara et al. .
4,900,444 2/1990 Seita et al. ...................... 210/500.36
4,964,991 10/1990 Seita et al. .

FOREIGN PATENT DOCUMENTS 61-114701  6/1986  Japan .
61-296113 12/1986  Japan .
62-97603   5/1987  Japan .
62-106770  5/1987  Japan .

Primary Examiner—David Isabella
Assistant Examiner—G. Gualtieri
Attorney, Agent, or Firm—Burns, Doane, Swecker & Mathis

[57] ABSTRACT

A porous polypropylene hollow fiber membrane is disclosed which is characterized by the fact that the solid phase in the inner surface region thereof is formed with particles of polypropylene closely fused and joined to give rise to a continuous phase while partially exposed through the surface thereof, the solid phase in the interior and the outer surface region thereof is formed with particles of polypropylene interconnected in the direction of axis of fiber to give rise to a multiplicity of lumps of polypropylene, and the interstices between these solid phases has continuous pores interconnected in the form of a three-dimensional network. When this porous polypropylene hollow fiber membrane is used in an artificial lung, without reference to the choice between the type adapted to pass blood inside the hollow fiber membrane, it exhibits a high gas-exchange capacity without infliction of injury upon blood cells, aggravation of pressure loss, or leakage of blood plasma. Further a flat-film type porous polypropylene membrane possessing a microreticular structure is disclosed which is characterized by the fact that either or both of the opposite surface region of the porous membrane forms a surface layer possessing practically the same microreticular structure as in the interior of said membrane and said membrane possesses an average pore diameter in the range of 0.1 to 5.0 μm, a bubble point of not more than 2.0 kgf/cm$^2$, a porosity in the range of 60 to 85%, a water permeability of not less than 100 ml/min.mmHg.m$^2$ and a wall thickness in the range of 30 to 300 μm. When this flat-film type porous polypropylene membrane is used for blood plasma separation, it effects the blood plasma separated at a high speed and sparingly entails occlusion of blood cells or hemolysis.

6 Claims, 18 Drawing Sheets

Vertical to this paper

Vertical to this paper

Vertical to this paper

Vertical to this paper

Vertical to this paper

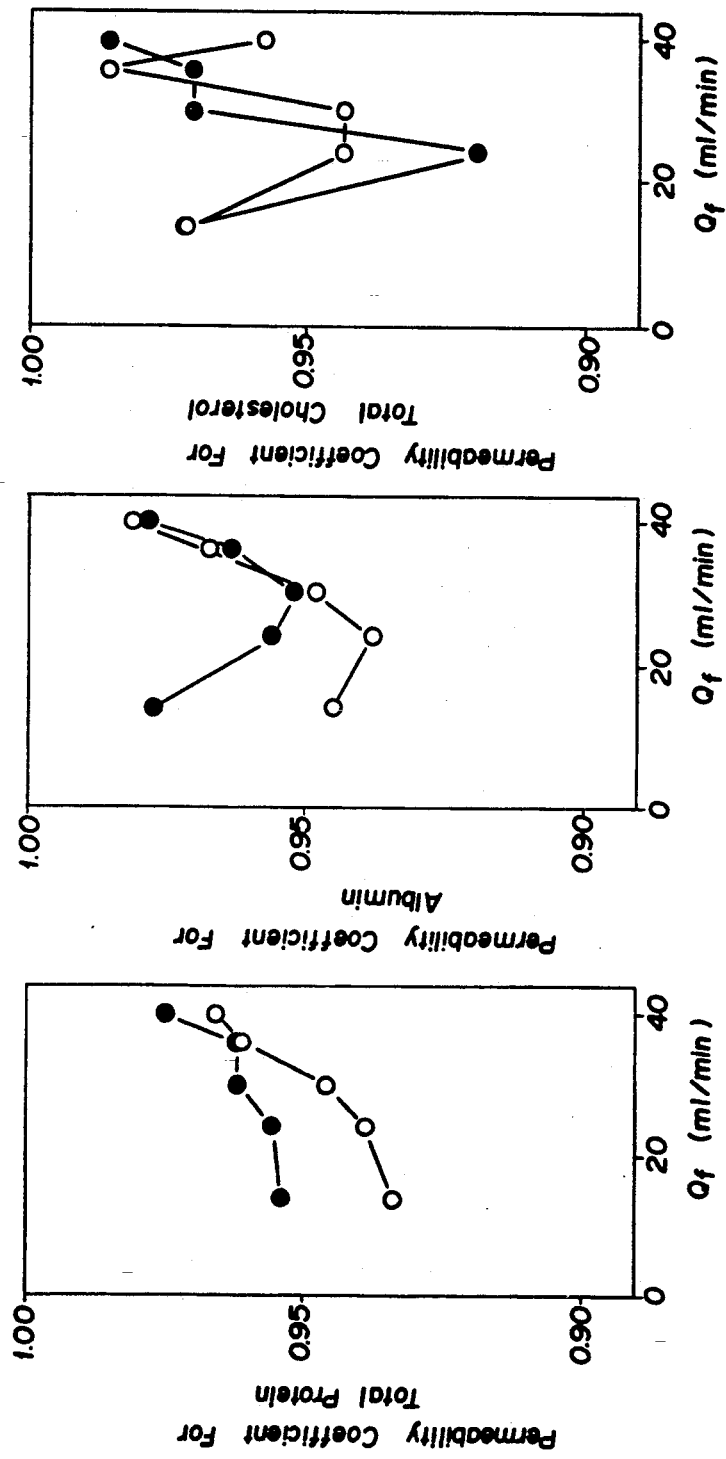

POROUS POLYPROPYLENE MEMBRANE AND METHODS FOR PRODUCTION THEREOF

TECHNICAL FIELD

This invention relates to a porous polypropylene membrane and a method for the production thereof.

Further, this invention relates to a porous polypropylene hollow fiber membrane, a method for the production thereof, and an artificial lung using the hollow fiber membrane. More particularly, this invention relates to a porous polypropylene hollow fiber membrane possessing a high gas-exchange capacity, a method for the production thereof, and an artificial lung using the hollow fiber membrane. Still more particularly, this invention relates to a porous polypropylene hollow fiber membrane which, while being used in an artificial lung of the type passing blood inside or the type passing blood outside the hollow fiber membrane, exhibits a high gas-exchange capacity without inflicting damage upon blood components, inducing an increase in the pressure loss, or suffering from leakage of blood plasma during a protracted service, a method for the production thereof, and an artificial lung using the hollow fiber membrane.

This invention also relates to a flat-film type porous polypropylene membrane to be used for blood plasma separation, i.e. separation of blood into blood cells and blood plasma, and for removal of bacteria from blood and a method for the production thereof. More particularly, this invention relates to a flat-film type porous polypropylene membrane which, when used for the blood plasma separation, exhibits a high blood plasma separation speed and has only a sparing possibility of incurring such adverse phenomena as leakage of part of the blood cells in the blood plasma after the blood-plasma separation and hemolysis and a method for the production thereof.

BACKGROUND ART

Generally in the cardiac operation, an artificial lung of hollow fiber membrane is used as inserted in the extra-corporeal circulatory path for the purpose of leading a patient's blood out of his body, adding oxygen to the blood, and removing carbon dioxide gas from the blood. The hollow fiber membranes available in the artificial lungs of this nature come in the two types, namely the homogeneous membrane and the porous membrane. The homogeneous membrane effects passage of a gas by allowing the molecules of the gas to be dissolved and dispersed in the membrane. A typical example of the homogeneous membrane is silicone rubber, which has been commercialized as MERA SILOX (Senko Ika Kogyo K.K.),for instance. Because of the restriction imposed by the gas permeability, silicone rubber is the only practicable homogeneous membrane known to the art. The silicone rubber membrane, by reason of strength, is not allowed to have a wall thickness less than 100 $\mu$m. It, therefore, has limited gas permeability and exhibits particularly poor permeability to carbon dioxide gas. Worse still, the silicone rubber has a disadvantage that it is expensive and deficient in workability.

In contrast, the porous membrane is such that the micropores contained in the membrane are notably large as compared with the molecules of a gas given to be passed and, therefore, the gas passes the micropores in the form of volume flow. Various artificial lungs using microporous polypropylene membranes and other similar porous membranes have been proposed. It has been proposed, for example, to manufacture porous polypropylene hollow fibers by melt spinning polypropylene with a nozzle for the production of hollow fibers at a spinning temperature in the range of 210° to 270° C. at a draft ratio in the range of 180 to 600, then subjecting the spun fibers to a first heat treatment at a temperature of not more than 155° C., stretching the hot spun fibers to an extent in the range of 30 to 200% at a temperature below 110° C., and subjecting the stretched fibers to a second heat treatment at a temperature exceeding the temperature of the first heat treatment and not exceeding 155° C. (Japanese Patent Publication SHO 56(1981)-52,123). In the porous hollow fibers obtained as described above, since the micropores are physically formed by stretching polypropylene hollow fibers, they are linear micropores substantially horizontal to the direction of the membrane thickness. Further, these micropores are formed by producing cracks in the axial direction of hollow fibers in conformity with the degree of stretching, resulting in a cross section of the shape of a slit. Moreover, the micropores continuously run substantially linearly through the membrane and account for a high porosity. The porous hollow fibers described above, therefore, have a disadvantage that they exhibit high permeability to steam and, when used for extracorporeal circulation of blood for a long time, suffer leakage of blood plasma.

As a porous membrane incapable of incurring leakage of blood plasma, a porous polyolefin hollow fiber has been proposed which is produced by mixing a polyolefin, an organic filler uniformly dispersible in the polyolefin while the polyolefin is in a molten state and readily soluble in an extractant to be used later, and a crystalline core forming agent, discharging the resultant mixture in a molten state through annular spinning orifices and, at the same time, introducing inactive gas into the interiors of the hollow threads of the mixture, cooling and solidifying the hollow threads by contact with a cooling and solidifying liquid incapable of dissolving the aforementioned polyolefin, and then bringing the cooled and solidified hollow threads into contact with the aforementioned extractant thereby removing the aforementioned organic filler by extraction from the hollow threads (Japanese Patent Application SHO 59(1984)-210,466,). One version of the aforementioned hollow fiber membrane is obtained by using, as a cooling and solidifying liquid, a cooling and solidifying liquid capable of dissolving the organic filler to be used as desirable for the process; however, this membrane has a small pore density per unit area and possibly offers an insufficient gas-exchange capacity for use in an artificial lung, though it has no possibility of incurring leakage of blood plasma because the pores are small and complicated in shape. There is another possibility that the low molecular component of the polyolefin will mingle into the cooling and solidifying liquid capable of dissolving the organic filler, eventually adhere to the inner wall of the cooling bath, and cause the shape of the hollow fibers to vary with elapse of time.

As an amendment of such drawbacks as mentioned above, there has been proposed a porous polyolefin hollow fiber membrane produced by a process which comprises mixing polypropylene, an organic filler uniformly dispersible in the polypropylene while the polypropylene is in a molten state and readily soluble in an extractant to be used later, and a crystalline core forming agent, discharging the resultant mixture in a molten state through annular spinning orifices thereby forming hollow threads, cooling and solidifying the hollow threads by contact with a liquid of the aforementioned organic filler or a compound similar thereto, and then bringing the cooled and solidified hollow threads into contact with the extractant incapable of dissolving the polypropylene thereby removing the aforementioned organic filler from the hollow threads by extraction (Japanese Patent Application SHO 61(1986)-155,159). The hollow fiber membrane which is obtained by this method is free from the drawbacks enumerated above. During the course of cooling, however, the organic filler or the cooling and solidifying liquid is locally deposited on the outermost surfaces of the hollow fibers which have not yet been thoroughly cooled and solidified, to lower the ratio of distribution of the polypropylene composition on the outermost surfaces and consequently enlarge the pores in the outer surfaces of the hollow fibers and cause the polypropylene to continue in the form of a heavily rugged network. When the hollow fibers of this nature are used in an artificial lung of the type adapted to pass blood inside the hollow fibers and blow an oxygen-containing gas outside the hollow fibers to effect addition of oxygen to the blood and removal of carbon dioxide gas from the blood, no problem is raised. Conversely when the hollow fibers are used in an artificial lung of the type adapted to flow blood outside the hollow fibers and blow an oxygen-containing gas inside the hollow fibers, they entail a disadvantage that the outer surface of the hollow fibers, owing to their quality described above, inflict an injury on the blood cells and aggravate the pressure loss. Further, the artificial lung using such a hollow fiber membrane as described above, without reference to the choice between the two types of artificial lung, has a disadvantage that during the course of assembly of the artificial lung, the individual hollow fibers conglomerate to impair the workability thereof and jeopardize the effect of potting.

Heretofore, various permeable membranes have been adopted for the purpose of separating blood into blood cells and blood plasma. These permeable membranes are used for blood plasma purification aimed at removal of abnormal proteins, antigens, antibodies, and immune complexes in such diseases due to abnormal immunity as systemic lupus erythematosus, rheumatoid arthritis, glomerular nephritis, and myasthenia gravis, for manufacture of blood plasma preparations for component transfusion, and for pretreatment of artificial kidneys, for example. As examples of the permeable membranes heretofore used for the blood plasma separation mentioned above, there can be cited a cellulose acetate membrane (Japanese patent Unexamined Publication SHO 54(1979)-15,476) and a polyvinyl alcohol membrane, a polyester membrane, a polycarbonate membrane, a polymethyl methacrylate membrane, and a polyethylene membrane (Japanese Patent Unexamined Publication SHO 57(1982)-84,702). These permeable membranes are deficient in mechanical strength, porosity, and plasma separating ability. When these permeable membranes are used in the blood plasma separation, owing to the clogging of the micropores therein, the erythrocytes are injured and the components of complement in the blood plasma are activated and the separated blood plasma is seriously injured as the result.

A permeable membrane has been proposed which is produced by mixing a polymer such as a crystalline polyolefin or polyamide which is sparingly soluble in a solvent and is stretchable and a compound partially compatible with the polymer and readily soluble in the solvent, molding the resultant mixture in the form of film, sheet, or a hollow article, treating the shaped article with the solvent, drying the treated shaped article, and then uniaxially or biaxially stretching the dried shaped article to an extent falling in the range of 50 to 15,000% (Japanese Patent Publication SHO 57(1982)-20,970). Since this membrane has been stretched for the purpose of increasing pore diameter, it is susceptible of thermal shrinkage so much that, when the permeable membrane is used in a medical device, it will not be able to be safely sterilized in an autoclave. Moreover since the micropores are formed by stretching in the permeable membrane, they are linear micropores substantially parallel to the direction of thickness of the membrane. Since the micropores have a substantially uniform shape in the opposite surfaces and in the interior of the wall of the membrane, they are inevitably clogged with proteins and blood cells when the permeable membrane is used in the blood plasma separation.

As concerns permeable membranes for use in the blood plasma separation, polyolefin type macromolecules have been attracting attention as materials experiencing activation of complements only to a nominal extent and excelling in bio-adaptability. At present, studies are underway on the feasibility of permeable membranes using such polyolefin type macromolecules. For example, there has been disclosed a method for the production of a porous membrane, which comprises preparing a molten mixture consisting of 10 to 80% by weight of a paraffin and 90 to 20% by weight of a polypropylene resin, extruding the molten mixture through a die in the form of a film, a sheet, or a hollow fiber, suddenly solidifying the molten extruded mixture in water kept at a temperature of not more than 50° C, and then separating the paraffin from the shaped article by extraction (Japanese Patent Unexamined Publication SHO 55(1980)-60,537). The porous membrane which is obtained by this method, however, does not fit speedy blood plasma separation because the membrane has been suddenly cooled with water, a substance of a large specific heat, and, as the natural consequence, the pores formed in the surfaces and those formed in the interior of the membrane have small diameters and the porosity is low and the speed of permeation is proportionately low.

As means of cooling and solidifying the aforementioned molten mixture, there has been proposed a method which uses a metallic roller and a method which uses a cooling and solidifying liquid such as a paraffin possessing highly desirable compatibility with the aforementioned organic filler (Japanese Patent Application SHO 60(1985)-237,069). The former method produces a porous membrane which possesses surface pores of an extremely small diameter and, therefore, passes blood plasma only at a low speed. In the latter method, since the cooling and solidifying liquid has a small specific heat as compared with water and, therefore, promotes the crystallization of polypropylene at a proper cooling rate, the membrane is enabled in the interior thereof to form micropores of a diameter large enough for the purpose of blood plasma separation and is suffered in the surface regions thereof to form a very large reticular structure which is believed to arise because the polypropylene in the surface regions is dissolved out into the cooling and solidifying liquid before it is allowed to solidify. In the porous membrane possessing such surface layers as described above, the surface layers each function as a prefilter. Thus, the porous membrane is capable of carrying out the blood plasma separation at a highly desirable speed without suffering proteins and blood cells to clog the micropores. When this porous membrane is brought into contact with blood, however, it is liable to occlude blood cells, which may possibly be forced to liberate homoglobin under application of pressure.

An object of this invention, therefore, is to provide an improved porous polypropylene membrane and a method for the production thereof.

Another object of this invention, is to provide an improved porous polypropylene hollow fiber membrane, a method for the production thereof, and an artificial lung using the hollow fiber membrane. A further object of this invention is to provide a porous polypropylene hollow fiber membrane possessing a high gas-exchange capacity, a method for the production thereof, and an artificial lung using the hollow fiber membrane. Still another object of this invention is to provide a porous polypropylene hollow fiber membrane which, while being used in an artificial lung of either of the type passing blood inside or the type passing blood outside, induces no leakage of blood plasma and retains a high gas-exchange capacity intact through a protracted service without impairing blood cells or aggravating pressure loss and which, therefore, is useful for an artificial lung, a method for the production thereof, and an artificial lung using the hollow fiber membrane. Yet another object of this invention is to provide a porous polypropylene hollow fiber membrane which possesses a smooth outer surface and defies conglomeration of individual hollow fibers thereof during the course of assembly of an artificial lung, a method for the production thereof, and an artificial lung using the hollow fiber membrane.

Another object of this invention is to provide an improved flat-film type porous polypropylene membrane and a method for the production thereof. A further object of this invention is to provide a flat-film type porous polypropylene membrane to be used for blood plasma separation aimed at separating blood into blood cells and blood plasma and for removal of bacteria from blood and a method for the production thereof. Yet another object of this invention is to provide a flat-film type porous polypropylene membrane which, while being used for blood plasma separation, permits the blood plasma separation to proceed at a high speed, suffers the separated blood plasma to be injured only sparingly, and has little possibility of entailing occlusion of blood cells or hemolysis and a method for the production thereof.

DISCLOSURE OF THE INVENTION

The various objects described above are accomplished by a porous polypropylene hollow fiber membrane wherein the solid phase in the inner surface region thereof is formed with particles of polypropylene closely fused and joined to give rise to a continuous phase while partially exposed through the surface thereof, the solid phase in the interior and the outer surface region thereof is formed with particles of polypropylene interconnected in the direction of axis of fiber to give rise to a multiplicity of lumps of polypropylene, and the interstices between these solid phases has continuous pores interconnected in the form of a three-dimensional network.

This invention also discloses a porous polypropylene hollow fiber membrane, wherein the index of birefringence thereof in the direction of axis is in the range of 0.001 to 0.01. This invention further discloses a porous polypropylene hollow fiber membrane, wherein the porosity thereof is in the range of 10 to 60% and the aperture ratio of the inner surface region thereof is in the range of 10 to 30% and the oxygen gas flux is in the range of 100 to 1,500 liters/min.m$^2$.atm. This invention further discloses a porous polypropylene hollow fiber membrane, wherein the inside diameter is in the range of 150 to 300μm and the wall thickness in the range of 10 to 150μm. This invention also discloses a porous polypropylene hollow fiber membrane, wherein the average diameter of the particles of polypropylene is in the range of 0.1 to 2.0μm and the average diameter of the pores in the inner surface region is in the range of 0.1 to 1.0 μm. This invention further discloses a porous polypropylene hollow fiber membrane, wherein the membrane used in an artificial lung is substantially free from leakage of blood plasma or degradation of gas-exchange capacity within 30 hours of service. Further this invention discloses a porous polypropylene hollow fiber membrane, wherein the membrane used in an artificial lung sparingly inflicts injury on blood cells.

The objects described above are accomplished by a method for the production of a porous polypropylene hollow fiber membrane, which is characterized by mixing polypropylene, an organic filler uniformly dispersible in the polypropylene in a molten state and easily soluble in an extractant to be used later, and a crystalline seed forming agent, discharging the resultant mixture in a molten state through annular spinning orifices, cooling and solidifying the resultant hollow threads by contact with a cooling and solidifying liquid having no compatibility with the aforementioned organic filler and possessing a specific heat capacity in the range of 0.2 to 0.7 cal/g, and then bringing the cooled and solidified hollow threads into contact with an extractant incapable of dissolving polypropylene thereby removing the organic filler therefrom by extraction.

This invention also discloses a method for the production of a porous polypropylene hollow fiber membrane, wherein silicone oil or polyethylene glycol is used as the cooling and solidifying liquid. This invention also discloses a method for the production of a porous polypropylene hollow fiber membrane, wherein silicone oil possesses viscosity in the range of 2 to 50 cSt at 20° C. This invention also discloses a method for the production of a porous polypropylene hollow fiber membrane, wherein polyethylene glycol possesses an average molecular weight in the range of 100 to 400. This invention further discloses a method for the production of a porous polypropylene hollow fiber membrane, wherein liquid paraffin is used as the organic filler. This invention further discloses a method for the production of a porous polypropylene hollow fiber membrane, wherein the amount of the organic filler to be incorporated is in the range of 35 of to 150 parts by weight, based on 100 parts by weight of polypropylene. This invention also discloses a method for the production of a porous polypropylene hollow fiber. membrane, wherein the crystalline seed forming agent is an organic heat-resistant substance possessing a melting point of not less than 150° C. and a gelling point not less than the crystallization starting point of polypropylene. Further, this invention discloses a method for the production of a porous polypropylene hollow fiber membrane, wherein the amount of the crystalline seed forming agent to be incorporated is in the range of 0.1 to 5 parts by weight, based on 100 parts by weight of polypropylene.

The objects described above are further accomplished by an artificial lung provided with a hollow fiber membrane as a gas-exchange membrane, characterized by the fact that the hollow fiber membrane is a porous polypropylene hollow fiber membrane wherein the solid phase in the inner surface region thereof is formed with particles of polypropylene closely fused and joined to give rise to continuous phase while partially exposed through the surface thereof, the solid phase in the interior and the outer surface region thereof is formed with particles of polypropylene interconnected in the direction of axis of fiber to give rise to a multiplicity of lumps of polypropylene, and the interstices between these solid phases have continuous pores interconnected in the form of a three-dimensional network.

This invention further discloses an artificial lung, wherein the index of birefringence of the porous polypropylene hollow fiber used therein in the direction of axis is in the range of 0.001 to 0.01. This invention also discloses an artificial lung, wherein the porosity of the porous polypropylene hollow fiber used therein is in the range of 10 to 60% and the aperture ratio of the inner surface region thereof is in the range of 10 to 30% and the oxygen gas flux is in the range of 100 to 1,500 liters/min.m$^2$.atm. This invention further discloses an artificial lung, wherein the inside diameter of the porous polypropylene hollow fiber used therein is in the range of 150 to 300 $\mu$m and the wall thickness in the range of 10 to 100 $\mu$m. This invention further discloses an artificial lung provided with a hollow fiber membrane and adapted to circulate blood inside the hollow fiber membrane and blow an oxygen-containing gas outside the hollow fiber membrane. Further this invention discloses an artificial lung provided with a hollow fiber membrane and adapted to circulate blood outside the hollow fiber membrane and blow an oxygen-containing gas inside the hollow fiber membrane. This invention further discloses an artificial lung which is substantially free from leakage of blood plasma or degradation of gas-exchange capacity within 30 hours of extracorporeal circulation of blood. This invention also discloses an artificial lung which sparingly inflicts injury on blood cells during the extra-corporeal circulation of blood. This invention further discloses an artificial lung using a hollow fiber membrane, wherein the particles of polypropylene of the hollow fiber membrane possess an average particle diameter in the range of 0.1 to 2.0 $\mu$m and the pores in the inner surface region of the hollow fiber membrane possess an average diameter in the range of 0.1 to 1.0 $\mu$m.

The objects described above are accomplished by a flat-film type porous polypropylene membrane possessing a microreticular structure, characterized by the fact that either or both of the opposite surface region of the porous membrane forms a surface layer possessing practically the same microreticular structure as in the interior of said membrane and said membrane possesses an average pore diameter in the range of 0.1 to 5.0 $\mu$m, a bubble point of not more than 2.0 kgf/cm$^2$, a porosity in the range of 60 to 85%, a water permeability of not less than 100 ml/min.mmHg.m$^2$ and a wall thickness in the range of 30 to 300 $\mu$m.

This invention also discloses a flat-film type porous polypropylene membrane, wherein the bubble point of the membrane is not more than 1.8 kgf.cm$^2$. This invention further discloses a flat-film type porous polypropylene membrane, wherein the water permeability is not less than 140 ml/min.mmHg.m$^2$. Further this invention discloses a flat-film type porous polypropylene membrane, wherein the shrinkage ratio after 120 minutes' heat treatment at 121° C. is not more than 6.0%.

The objects described above are further accomplished by a method for the production of a flat-film type porous polypropylene membrane, characterized by mixing 100 parts by weight of polypropylene, 200 to 600 parts by weight of an organic filler uniformly dispersible in the polypropylene in the molten state, and 0.1 to 5.0 parts by weight of a crystalline seed forming agent, discharging the resultant mixture in a molten state through a die thereby producing a molten membrane in the form of a flat film, cooling and solidifying the molten membrane by contact with a cooling and solidifying liquid exhibiting no compatibility to the organic filler and possessing a specific heat capacity in the range of 0.2 to 0.7 cal/g, and then bringing the cooled and solidified membrane into contact with an extractant incapable of dissolving the polypropylene and capable of dissolving the organic filler thereby removing the organic filler from the membrane by extraction.

This invention also discloses a method for the production of a flat-film porous polypropylene membrane, wherein the porous polypropylene membrane obtained after the aforementioned removal of the organic filler by extraction is fixed in a prescribed length is subjected to a heat treatment at a temperature in the range of 110° to 140° C. This invention further discloses a method for the production of a flat-film type porous polypropylene membrane, wherein the contact of the molten membrane with the cooling and solidifying liquid is effected by disposing a guide roller in the cooling and solidifying liquid, allowing part of the guide roller to emerge from the surface of the cooling and solidifying liquid, discharging the aforementioned mixture onto the guide roller, and allowing the mixture to be led into the cooling and solidifying liquid by the rotation of the guide roller. Further this invention discloses a method for the production of a flat-film type porous polypropylene membrane, wherein the cooling and solidifying liquid is a polyether. This invention also discloses a method for the production of a flat-film type porous polypropylene membrane, wherein the polypropylene is a polypropylene possessing a melt index in the range of 5 to 40 and having mixed therewith 0 to 50% by weight of a polypropylene possessing a melt index in the range of 0.05 to 5. This invention also discloses a method for the production of a flat-film type porous polypropylene membrane, wherein the crystalline seed forming agent is incorporated therein in an amount in the range of 0.1 to 1.0 part by weight. This invention further discloses a method for the production of a flat-film type porous polypropylene membrane, wherein the crystalline seed forming agent is an organic heat-resistant substance possessing a melting point of not less than 150° C. and a gelling point of not less than the crystallization starting point of the polypropylene. Further, this invention discloses a method for the production of a flat-film type porous polypropylene membrane, wherein the extractant is a halogenated hydrocarbon or a mixture of the halogenated hydrocarbon with a ketone.

BRIEF DESCRIPTION OF THE DRAWINGS

FIG. 31 a through c illustrate relations of permeation of various components of blood plasma vs the blood plasma separation speed (Qf).

FIGS. 29 through 31C illustrate the data of Example 3 with blank cycles (◯) and the data of Control 5 with solid circles (●)

BEST MODE FOR CARRYING OUT THE INVENTION

Now, the present invention will be described below with reference to working examples. To facilitate comprehension of this invention, paragraphs titled "Porous polypropylene Hollow Fiber Membrane," "Method for the Production of Porous Polypropylene Hollow Fiber Membrane," "Flat-Film Type Porous Polypropylene Membrane", "Method for the Production of Flat-Film Type Porous Polypropylene Membrane", and "Example" will be included in the following part of the text hereof.

Porous Polypropylene Hollow Fiber Membrane

Figure 1:
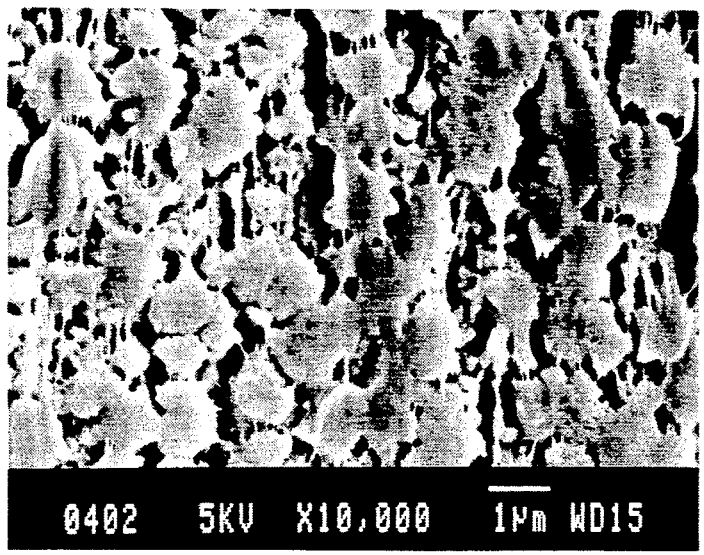
FIGS. 1 through 6 are electron microscope photographs illustrating textures of porous polypropylene hollow fiber membranes of the present invention.
Figure 4:
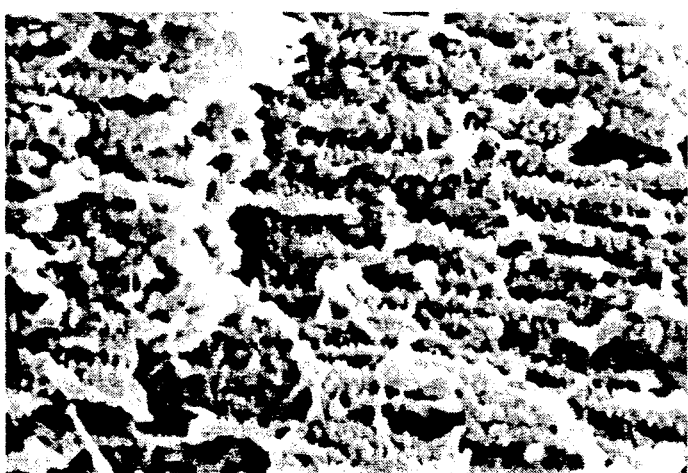

The porous polypropylene hollow fiber membrane of the present invention is a hollow fiber membrane of polypropylene substantially circular in cross section, possessing an inside diameter in the range of 150 to 300 $\mu m$, preferably 180 to 250 $\mu m$, a wall thickness in the range of 10 to 150 $\mu m$, desirably 20 to 100 $\mu m$, and more desirably 40 to 50 $\mu m$. The microstructure of this hollow fiber membrane of polypropylene is variable with the production conditions of the hollow fiber membrane. Generally, it acquires a microstructure as shown in the scanning electron microscope photographs of FIGS. 1 through 6 by using as the cooling and solidifying liquid of the nature to be described later a solution showing no compatibility to the organic filler and possessing a specific heat capacity in the range of 0.2 to 0.7 cal/g. To be specific, on the inner surface side, the solid phase is formed with particles of polypropylene closely fused and joined while partly exposed through the surface, namely, they are fused and then cooled and solidified to give rise to a continuous phase (FIGS. 2 through 6). In the interior of the membrane, the solid phase is formed with a multiplicity of particles of polypropylene randomly gathered without any directionality in the circumferential direction (FIG. 3) and interconnected in the direction of axis of fiber to give rise to lumps of polypropylene, which are interlaced (FIG. 4). The solid phase in the interior of the membrane, therefore, is believed to be formed with an aggregate of a multiplicity of lumps of polypropylene, which each consist of particles of polypropylene interconnected in the direction of axis of fiber. Further on the outer surface region similarly to the interior of the membrane, the solid phase is formed with an aggregate of multiplicity of lumps of polypropylene, which each consist of particles of polypropylene interconnected in the direction of axis of fiber (FIG. 1). Then, in the interstices between these solid phases mentioned above, pores extending from the inner surface to the outer surface of the thick wall portion inclusive of the inner surface and the outer surface of the hollow fiber are interconnected not linearly but in a complicated reticular pattern to give rise to continuous pores of the form of a three-dimensional shape. The complexity of the arrangement of these continuous pores is evinced by the fact that the ratio of birefringence in the direction of axis of the porous polypropylene hollow fiber membrane of this invention is extremely low so as to fall in the range of 0.001 to 0.01 and the property of orientation of the polypropylene crystals is small.

When the porous polypropylene hollow fiber membrane of the present invention constructed as described above is used in an artificial lung adapted to pass blood inside the hollow fiber, it neither inflicts any injury upon the blood cells nor induces any aggravation of pressure loss because the inner surface of the membrane consists of the continuous phase formed with particles of polypropylene closely fused and joined while partially exposed through the surface and the remaining part of pores and possesses the quality of smoothness. In contrast, when the porous polypropylene hollow fiber membrane is used in an artificial lung adapted to pass blood outside the hollow fiber, it neither inflicts any injury on the blood cells nor induces any aggravation of pressure loss because the outer surface of the membrane consists of the solid phase formed with an aggregate of a multiplicity of lumps of polypropylene each having particles of polypropylene arranged orderly in the direction of fiber and the remaining part of pores and possesses the quality of smoothness. Further the pores of the porous polypropylene hollow fiber membrane which serve as the routes for a gas when the porous polypropylene hollow fiber membrane is used in an artificial lung are continuous pores interconnected complexly and reticularly in a three-dimensional network. When the extra-corporeal circulation of blood is effected either inside or outside the hollow fiber membrane, the blood plasma component of the blood cannot pass through such long complexly interlaced routes. Thus, the artificial lung shows substantially no sign of leakage of blood plasma or degradation of gas-exchange capacity after 30 hours' extra-corporeal circulation of blood, for example.

For the porous polypropylene hollow fiber membrane of this invention to be advantageously used in an artificial lung, the porosity is required to fall in the range of 10 to 60%, preferably 30 to 55%, the aperture ratio of the inner surface in the range of 10 to 30%, preferably 12 to 20%, and the oxygen gas flux in the range of 100 to 1,500 liters/min.m$^2$.atm, preferably 300 to 800 liters/min.m$^2$.atm. If the porosity is less than 10%, the membrane has the possibility of exhibiting an insufficient gas-exchange capacity. Conversely if the porosity exceeds 60%, the membrane has the possibility of leaking blood plasma. If the aperture ratio is less than 10%, the membrane has the possibility of exhibiting an insufficient gas-exchange capacity because of insufficient formation of continuous pores in the part of pores of the membrane. Conversely, if the aperture ratio exceeds 30%, the membrane has the possibility of suffering from leakage of blood plasma because of the lack of the complexity of continuous pores. If the oxygen gas flux deviates from the range of 100 to 1,500 liters/min.m$^2$.atm, the membrane has the possibility of failing to fulfill the function as a gas-exchange membrane. The sizes and distribution degrees of the particles of polypropylene and the continuous pores, i.e. the interstices between the adjacent particles of polypropylene, which make up the porous polypropylene hollow fiber membrane of the present invention can be controlled to their respectively desirable conditions by the production conditions of the membrane and the composition of raw materials used therefor. Generally, the particles of polypropylene are required to possess an average diameter in the range of 0.1 to 2.0 μm, preferably 0.2 to 1.5 μm and the pores opening in the inner surface to possess an average diameter in the range of 0.1 to 1.0 μm, preferably 0.3 to 0.6 μm.

Method for Production of porous polypropylene hollow fiber membrane

Figure 20:
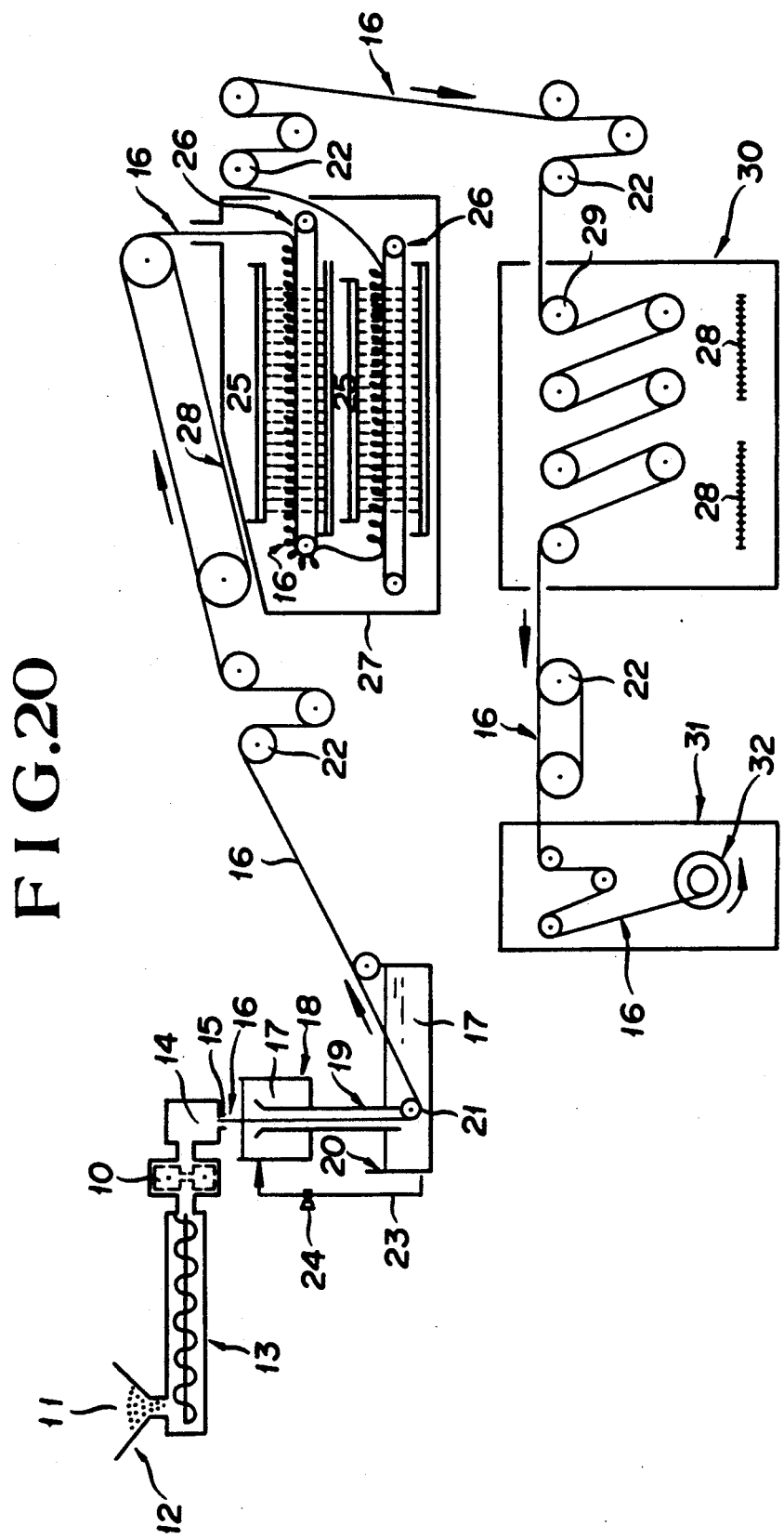
FIG. 20 is a schematic cross section of an apparatus to be used for the method of production of a porous polypropylene hollow fiber membrane the present invention.

The porous polypropylene hollow fiber described above is produced, for example, as follows. As illustrated in FIG. 20, a mixture 11 of polypropylene, an organic filler, and a crystalline seed forming agent is fed through a hopper 12 into a kneader such as, for example, a uniaxial extruding machine 13, there to be fused, blended, and extruded. Then, the extruded mixture is forwarded to a spinning device 14, discharged through an annular spinning orifice (not shown) of a spinneret 15 into a gaseous atmosphere such as, for example, air. A hollow thread 16 emanating from the spinneret 15 is introduced into a cooling tank 18 filled with a cooling and solidifying liquid 17, and cooled and solidified by contact with the cooling and solidifying liquid 17. In this case, the contact of the hollow thread 16 and the cooling and solidifying liquid 17 is desired to be effected by causing the aforementioned cooling and solidifying liquid 17 to flow down the interior of a cooling and solidifying liquid flow tube 19 disposed as directed downwardly through the bottom of the aforementioned cooling tank 18 as illustrated in FIG. 20 and allowing the aforementioned hollow thread 16 to fall down along the flow of the cooling and solidifying liquid and come into parallel contact therewith. The cooling and solidifying liquid 17 which has flowed down is received and stored in a solidifying tank 20. The hollow thread 16 is vertically introduced into the solidifying tank 20 and caused to change to course of travel by a deflection bar 21 so as to be solidified through ample contact therewith. The cooling and solidifying liquid 16 accumulating in the solidifying tank 20 is discharged via a circulation line 23 and circulated by a circulation pump 24 to the aforementioned cooling tank 18. Subsequently, the solidified hollow thread 16 is led to a shower conveyor type extruding machine 27 onto which an extractant 25 capable of dissolving the aforementioned organic filler and incapable of dissolving the polypropylene is dropped in the form of shower. In this extruding machine 27, the hollow thread 16 is brought into ample contact with the extractant and consequently deprived of the remaining organic filler while it is being advanced on a belt conveyor 26. The hollow thread which is led out of the extruding machine 27 by a drive roll 22, when necessary, is passed through the steps of re-extraction and heat treatment for drying and is finally taken up in a roll.

The polypropylene to be used as one of the raw materials for this invention need not be limited to homopolymer of propylene. It may be a block polymer using propylene as the main component and additionally incorporating therein another monomer. The polypropylene is required to possess a melt index (M.I.) in the range of 5 to 70, preferably 10 to 40. In the various forms of polypropylene mentioned above, the homopolymer of propylene proves to be particularly desirable. In the various species of homopolymer of propylene, that which has a high degree of crystallinity proves to be most desirable.

The organic filler is required to be uniformly dispersible in the polypropylene which is in a molten state and to be easily soluble in an extractant to be used later. Examples of the filler which fulfills this requirement include liquid paraffin (number average molecular weight 100 to 2,000), α-olefin oligomers [such as, for example, ethylene oligomer (number average molecular weight 100 to 2,000), propylene oligomer (number average molecular weight 100 to 2,000), and ethylene oligomer (number average molecular weight 100 to 2,000)], paraffin wax (number average molecular weight 200 to 2,500), and various hydrocarbons. In the organic fillers enumerated above, the liquid paraffin proves to be particularly desirable.

The mixing ratio of the polypropylene and the aforementioned organic filler is such that the proportion of the organic filler to 100 parts by weight of the propylene is in the range of 35 to 170 parts by weight, preferably 80 to 150 parts by weight. If the proportion of the organic filler is less than 35 parts by weight, the produced hollow fiber membrane cannot manifest sufficient permeability to gas because part of the membrane is formed with a continuous phase of polypropylene. Conversely, if the proportion exceeds 170 parts by weight, the moldability of the mixture in the form of a hollow fiber is degraded because the viscosity of the mixture is unduly lowered. For the formulation of raw materials mentioned above, the mixture consisting of raw materials in a prescribed percentage composition is prepared (designed) by the premix method which comprises melting and blending the mixture, extruding the resultant blend, and pelletizing the extruded blend by the use of a biaxial type extruding machine, for example.

The crystalline seed forming agent to be included in the raw materials for this invention is an organic heat-resistant substance possessing a melting point of not less than 150° C. (preferably in the range of 200° to 250° C.) and a gelling point of not less than the crystallization starting point of polyolefin. The crystalline seed forming agent of this description is used as one of the raw materials for the purpose of causing contraction of the particles of polypropylene thereby narrowing the interstices namely the continuous pores between the particles and heightening the pores density. As examples of the crystalline seed forming agent, there can be cited 1,3,2,4-dibenzylidene sorbitol, 1,3,2,4-bis(p-methylbenzylidene) sorbitol, 1,3,2,4-bis(p-ethylbenzylidene) sorbitol, bis(4-t-butylphenyl) sodium phosphate, sodium benzoate, adipic acid, talc and kaolin.

Among other crystalline seed forming agents cited above, benzylidene sorbitols, especially 1,3,2,4-bis(p-ethylbenzylidene) sorbitol and 1,3,2,4-bis(p-methylbenzylidene) sorbitol prove to be particularly desirable because they are not significantly dissolved in the blood.

The mixing ratio of the propylene and the aforementioned crystalline seed forming agent is such that the proportion of the crystalline seed forming agent to 100 parts by weight of the polypropylene is in the range of 0.1 to 5 parts by weight, preferably 0.2 to 1.0 part by weight.

The mixture of raw materials prepared as described above is fused and blended in a uniaxial extruding machine, for example, at a temperature in the range of 160° C. to 250° C., preferably 180° to 220° C., extruded through an annular orifice of a spinning device into gaseous atmosphere, when necessary, by the use of a gear pump enjoying high accuracy of measurement, to give rise to a hollow thread. To the center of the interior of the annular orifice mentioned above, an inactive gas such as, for example, nitrogen, carbon dioxide, helium, argon, or air may be delivered through spontaneous suction or, when necessary, forced introduction. Subsequently, the hollow thread discharged through the annular orifice is allowed to fall down into contact with the cooling and solidifying liquid held inside the cooling tank. The distance of this fall of the hollow thread is in the range of 5 to 1,000 mm, preferably 10 to 500 mm. If this distance is less than 5 mm, the hollow thread is caused to pulsate and is possibly crushed at the time the hollow thread enters the cooling and solidifying liquid. Inside this cooling tank, the hollow thread has not yet been thoroughly solidified and it is liable to be deformed by an external force because the central part of the membrane is formed with a gas. The aforementioned hollow thread can be forced to move and the deformation of the hollow thread by the external force (such as fluid pressure) can be precluded by allowing the aforementioned solidifying liquid 17 to flow down the interior of the cooling and solidifying tube 19 disposed as directed downwardly through the bottom of the cooling tank 18 as illustrated in FIG. 20 and allowing the hollow thread to fall parallelly to the flow of the liquid. For the flow of the cooling and solidifying liquid to fulfill the purpose thereof, the flow rate obtained by gravitational attraction suffices. The cooling temperature used in this case is in the range of 10° to 90° C., preferably 20° to 75° C. If the cooling temperature is less than 10° C., the cooling and solidifying speed is unduly high and the greater part of the thick wall part of the membrane assumes the form of a closely packed layer and the gas-exchange capacity of the membrane is proportionately lowered. If this temperature exceeds 90° C., the hollow thread is not sufficiently cooled and solidified and is possibly broken within the cooling and solidifying tank.

As the cooling and solidifying liquid for this invention, a solution exhibiting no compatibility with the organic filler is used which possesses a specific heat capacity in the range of 0.2 to 0.7 cal/g, preferably 0.3 to 0.6 cal/g. As concrete examples of the cooling and solidifying liquid, there can be cited silicone oils such as dimethyl silicone oil and methylphenyl silicone oil possessing a kinetic viscosity in the range of 2 to 50 cSt, preferably 8 to 40 cSt, and polyethylene glycols possessing an average molecular weight in the range of 100 to 400, preferably 180 to 330. A liquid exhibiting no compatibility with the organic filler and possessing a specific heat capacity in the range of 0.2 to 0.7 cal/g is used as the cooling and solidifying liquid for the following reason.

When liquid paraffin is used as the organic filler and a halogenated hydrocarbon is used as the cooling and solidifying liquid capable of dissolving the organic filler mentioned above, it is inferred that the organic filler will be dissolved and extracted out and will pass from the inner to the outer side of the hollow thread while the phase separation of the polypropylene and the organic filler is proceeding in the cooling and solidifying liquid, the proportion of the organic filler near the inner surface of the hollow thread is lowered after the hollow thread has been thoroughly cooled and solidified, and the ratio of openings in the inner surface is unduly lowered and the gas-exchange capacity of the membrane is suffered to fall after the organic filler has been thoroughly dissolved and extracted out. Further, in the present case, there is the possibility that even the low molecular weight component of the polypropylene in the hollow thread is extracted out and suffered to accumulate and deposit on the inner wall of the cooling and solidifying liquid flow tube 19 shown in FIG. 20 and induce reduction of the inside diameter of the cooling and solidifying liquid flow tube 19 and consequent deformation of the hollow thread. When a compound identical or similar to the aforementioned organic filler is used as the cooling and solidifying agent, namely when a species of liquid paraffin is used as the organic filler and another species of liquid paraffin having a number average molecular weight approximating that of the first liquid paraffin is used as the cooling and solidifying agent, the organic filler (liquid paraffin) in the hollow thread is allowed to give rise to pores in a prescribed density without being significantly migrated within the hollow thread and the specific heat is not unduly large and, as the result, the polypropylene is crystallized at a proper cooling speed and enabled to acquire a stable form finally. During the course of the cooling, however, the organic filler or the cooling and solidifying liquid is suffered to occur locally on the outermost surface of the hollow thread which has not yet been thoroughly cooled and solidified and the ratio of the polypropylene composition is lowered on the outermost surface, and, as the result, the pores in the outer surface of the hollow thread are large and the solid phase finally assumes a heavily rugged surface condition because it is formed with particles of polypropylene spread out in the form of a network. When an inactive liquid which is incompatible with the organic filler and possesses a large specific heat capacity is used as the cooling and solidifying liquid, namely when liquid paraffin is used as the organic filler and water having a large specific heat capacity of about 1.0 cal/g is used as the cooling and solidifying agent, there is the possibility that the polypropylene will be quickly cooled and the outer surface will assume a state of low crystallinity because the cooling effect of water is high. The possible consequence is that the polypropylene will fail to form minute particles and the produced hollow fiber membrane will contain unduly small pores in the outer surface thereof and exhibit a small gas-exchange capacity. If the cooling and solidifying liquid to be used possesses a small specific heat capacity, there is the possibility that no sufficient cooling effect will be obtained and the extruded mixture will not be converted into a hollow thread as desired.

In contrast, when a solution exhibiting no compatibility with the aforementioned organic filler and possessing a specific heat capacity in the range of 0.2 to 0.7 cal/g is used as the cooling and solidifying liquid, the outer surface of the hollow fiber membrane, similarly to the interior thereof, is formed with an aggregate of a multiplicity of lumps of polypropylene each having minute particles of polypropylene interconnected in the direction of axis of fiber and is allowed to assume a smooth surface condition because the polypropylene is cooled at a proper speed and the polypropylene is crystallized smoothly while keeping a proper polypropylene composition ratio even in the outer surface, while the organic filler is not locally distributed on the outer surface of the hollow fiber.

The hollow thread which has been cooled and solidified in the cooling and solidifying tank is forwarded to an extracting machine, for example, as passed around a deflection bar to dissolve and extract the organic filler. The means for dissolving and extracting the organic filler need not be limited to the shower method which resides in causing the extractant to fall in the form of shower onto the hollow thread being forwarded on the belt conveyor as shown in FIG. 20. The extraction tank method or the rewinding method which, at the time that the hollow thread once wound up in a roll is rewound on a skein frame, immerses the skein in the extractant on the sole condition that the treatment should bring the hollow thread into contact with the extractant. Optionally, two or more such methods may be used in combination.

As the extractant, there can be used any of the liquids which are incapable of dissolving the propylene which forms the backbone of the hollow fiber membrane and capable of dissolving and extracting the organic filler. Examples of the liquid so usable include alcohols such as methanol, ethanol, propanols, butanols, pentanols, hexanols, octanols, and lauryl alcohol and halogenated hydrocarbons such as 1,1,2-trichloro-1,2,2-trifluoroethane, trichlorofluoromethane, dichlorofluoromethane, and 1,1,2,2-tetrachloro-1,2-difluoroethane. In all these extractants, halogenated hydrocarbons prove to be desirable from the standpoint of extraction capacity and chloro-flucrinated hydrocarbons prove to be especially desirable from the standpoint of safety on the human system.

The hollow fiber membrane which is obtained as described above, when necessary, is further subjected to a heat treatment. The heat treatment is carried out in a gaseous atmosphere such as air, nitrogen or carbon dioxide at a temperature in the range of 50° to 160° C., preferably 70° to 120° C., for a period in the range of 5 seconds to 120 minutes, preferably 10 seconds to 60 minutes. By this heat treatment, the hollow fiber membrane is structurally and dimensionally stabilized. Further, in this case, the hollow fiber membrane may be stretched prior to or during the heat treatment.

Artificial Lung

The porous polypropylene hollow fiber membrane which is obtained as described above is used most suitably in a hollow fiber membrane type artificial lung.

The hollow fiber membrane which is obtained by the conventional stretching method possesses gas permeability more than is necessary for an artificial lung. When it is used in an artificial lung adapted to circulate blood inside the hollow fiber, the oxygen addition ability encounters a large boundary membrane resistance on the blood side and the resistance of the hollow fiber membrane has no rate-determining effect and, in the meantime, the ability to remove carbon dioxide gas depends on the resistance of the hollow fiber membrane and the permeability to gas is excessive. When the hollow fiber membrane is used in an artificial lung adapted to circulate blood outside the hollow fiber, the gas-exchange capacity also depends on the resistance of the hollow membrane but the permeability is excessive.

The hollow fiber membrane of the present invention in its simple form possesses gas permeability lower than that of the conventional stretching method. It, however, acquires quality enough for the membrane to be used efficiently in an artificial lung. Moreover, since it is produced by the extraction method, it produces no pinhole and induces no leakage of blood and, therefore, is capable of preventing the gas-exchange capacity from falling.

In the hollow fiber membrane which is obtained by using, as the cooling and solidifying liquid, a liquid identical or similar to the organic filler, particles of polypropylene are interconnected in the form of a network and consequently caused to assume a heavily rugged surface. Thus, there ensues the possibility that while the individual hollow fibers are assembled to form an artificial lung, they will cohere fast possibly to the extent of rendering the work of assembly complicated and preventing the adhesive agent from being dispersed evenly around the individual hollow fibers, inducing defective potting.

In the hollow fiber membrane which is obtained by the method of the present invention, the outer surface of the membrane, similarly to the interior thereof, is formed with an aggregate of a multiplicity of lumps of polypropylene each having particles of polypropylene interconnected in the direction of axis of fiber and, therefore, is allowed to assume a smooth surface condition. Thus, while a multiplicity of such hollow fibers are assembled to form an artificial lung, the aforementioned drawbacks are not encountered. When the artificial lung is adapted to circulate the blood outside or inside the hollow fiber membranes, the membranes neither inflict any injury on the blood cells nor aggravate pressure loss.

Figure 21:
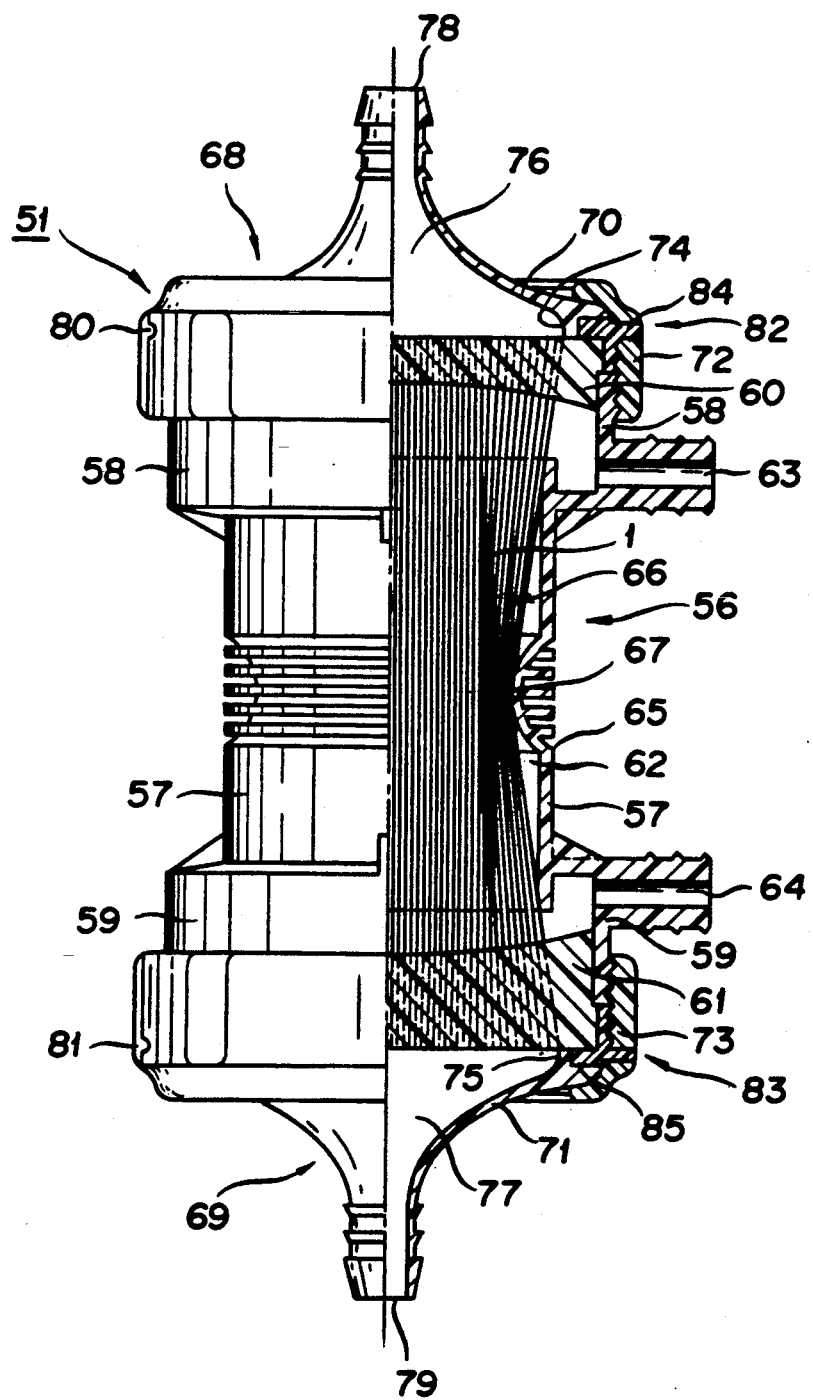
FIG. 21 is a semi-cross section illustrating a typical hollow fiber membrane type artificial lung as one embodiment of this invention.

FIG. 21 illustrates the condition of assembly of a hollow fiber membrane type artificial lung as one version of the hollow fiber membrane type artificial lung of the present invention. A hollow fiber membrane type artificial lung 51 is provided with a housing 56. This housing 56 comprises a cylindrical main body 57 and annular fitting covers 58, 59 fastened with a male screw to the opposite ends of the tubular main body. Inside the housing 56, a large number falling in the range of 10,000 to 65,000 of hollow fiber membranes 1 obtained as described above are disposed parallely along the longitudinal direction of the housing 56 as individually separated throughout the entire interior. The opposite ends of these hollow fiber membranes 1 are water-tightly supported with diaphragms 60, 61 inside the fitting covers 58, 59 in such a manner that the openings thereof will not be blocked up. The diaphragms 60, 61 mentioned above define an oxygen-containing gas chamber 62 as a first substance transfer fluid flow space in conjunction with the outer surfaces of the hollow fiber membranes 1 and the inner surface of the housing 56 and will block up the oxygen-containing gas chamber 62. They also function to isolate the oxygen-containing gas chamber 62 from blood flow spaces (not shown) which are formed inside the aforementioned hollow fiber membranes 1 for a second substance transfer fluid.

The fitting cover 58 is provided with an inlet 63 for supply of an oxygen-containing gas as the first substance transfer fluid. The other fitting cover 59 is provided with an outlet 64 for discharge of the oxygen-containing gas.

Figure 22:
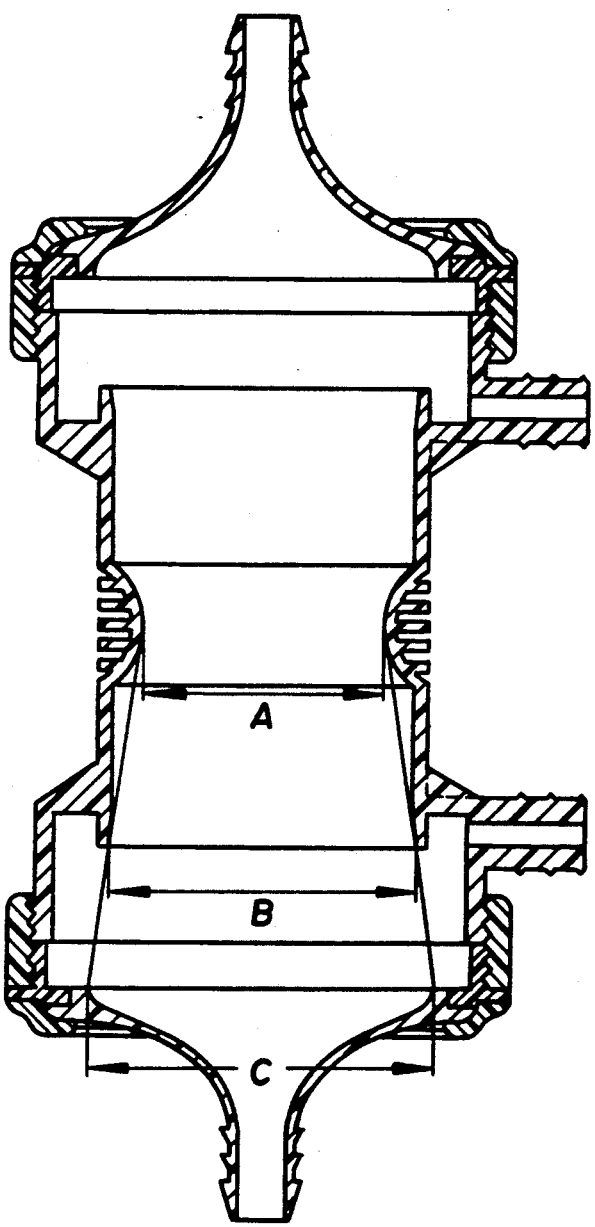
FIG. 22 is a cross section illustrating portions of the artificial lung relative to the hollow fiber membrane filling ratios.

The tubular main body 57 of the aforementioned housing 56 is desired to be provided on the inner surface thereof halfway along the direction of axis with a projected constricting part 65. This constricting part 65 is integrally formed with the tubular main body 57 on the inner surface and adapted to squeeze the overall outer periphery of a hollow fiber bundle 66 consisting of the multiplicity of hollow fiber membranes 1 inserted inside the tubular main body 57. As the result, the aforementioned tubular fiber bundle 66 is constricted at the center in the direction of axis to form a constricted part 67 as illustrated in FIG. 21. The packing ratio of the hollow fiber membranes 1, therefore, varies along the direction of axis and reaches the maximum at the center. For the reason to described later on, the packing ratios of varying parts of the hollow fiber bundle 66 are desired to be as follows. First, the packing ratio A in the constricted part 67 at the center is approximately in the range of 60 to 80%, the packing ratio B within the tubular main body 57 except for the constricted part 67 in the range of 30 to 60%, and the packing ratio C at the opposite ends of the hollow fiber bundle 66, namely on the outer surfaces of the diaphragms 60, 61 in the range of 20 to 40% as illustrated in FIG. 22.

Now, the formation of the aforementioned diaphragms 60, 61 will be described below. As described above, the diaphragms 60, 61 fulfill an important function of isolating the interiors from the exteriors of the hollow fiber membranes 1. Generally, these diaphragms 60, 61 are formed by centrifugally casting a macromolecular potting material of high polarity such as, for example, polyurethane, silicone, or epoxy resin in the inner wall surfaces at the opposite ends of the housing 56 and allowing the cast macromolecular material to harden. To be more specific, a multiplicity of hollow fiber membranes 1 of a length greater than that of the housing 56 are prepared and, with the openings thereof at the opposite ends blocked up with highly viscous resin, parallely disposed inside the tubular main body 57 of the housing 56. Subsequently, the opposite ends of the hollow fiber membranes 1 are completely concealed with pattern covers of a diameter larger than that of the fitting covers 58, 59 and the housing 56 is set rotating about the axis thereof and, at the same time, the macromolecular potting material is cast into the housing 56 through the opposite ends thereof. After the cast resin has been hardened, the aforementioned pattern covers are removed and the outer surface parts of the resin are cut off with a sharp blade to expose the open ends of the hollow fiber membranes 1 from the surfaces. In this manner, the diaphragms 60, 61 are formed.

The outer surfaces of the aforementioned diaphragms 60, 61 are respectively covered with flow path forming members 68, 69 each possessed of an annularly raised part. These flow path forming members 68, 69 severally consist of liquid distribution members 70, 71 and thread rings 72, 73. An inlet chamber 76 and an outlet chamber 77 for the blood as the second substance transfer fluid are formed by causing annular ridges 74, 75 disposed near the peripheral parts of the liquid distribution members 70, 71 to be pressed by the edge surfaces on the diaphragms 60, 61 mentioned above and helically fastening the thread rings 72, 73 to the fitting covers 58, 59. In the flow path forming members 68, 69, an inlet 78 and an outlet 79 for the blood as the second substance transfer fluid are formed.

Gaps are formed around the diaphragms 60, 61 as defined by the diaphragms 60, 61 and the flow path forming members 68, 69. These gaps are sealed as held in contact with the diaphragms 60, 61 by injecting a filler 84 or 85 through at least either of the two holes 80, 82, and 81, 83 communicating with the gaps. The sealing may be otherwise effected through the medium of an O-ring (not shown).

The hollow fiber membrane type artificial lung of the present embodiment is of a type adapted to use an oxygen-containing gas like air as the first substance transfer fluid and blood as the second substance transfer fluid, namely to feed the oxygen-containing gas outside the hollow fiber membranes and circulate blood inside the hollow fiber membranes to effect desired exchange of gases. Alternatively, the follow fiber membrane type artificial lung of this invention may be of another type adapted to circulate blood outside the hollow fiber membranes and feed the oxygen-containing gas inside the hollow fiber membranes to effect desired exchange of gases. In the latter type, the hollow fiber membrane type artificial lung has entirely the same construction as that of the present embodiment and is operated by using the blood as the first substance transfer fluid and the oxygen-containing gas as the second substance transfer fluid.

Flat-Film Type Porous Polypropylene Membrane

Figure 25:
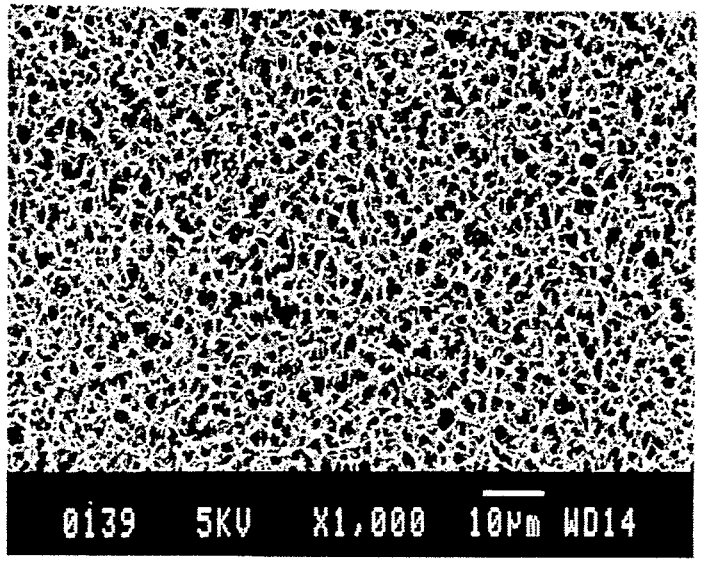
FIGS. 25 and 26 are electron microscope photographs illustrating textures of typical flat-film type porous polypropylene membranes of the present invention.
Figure 26:
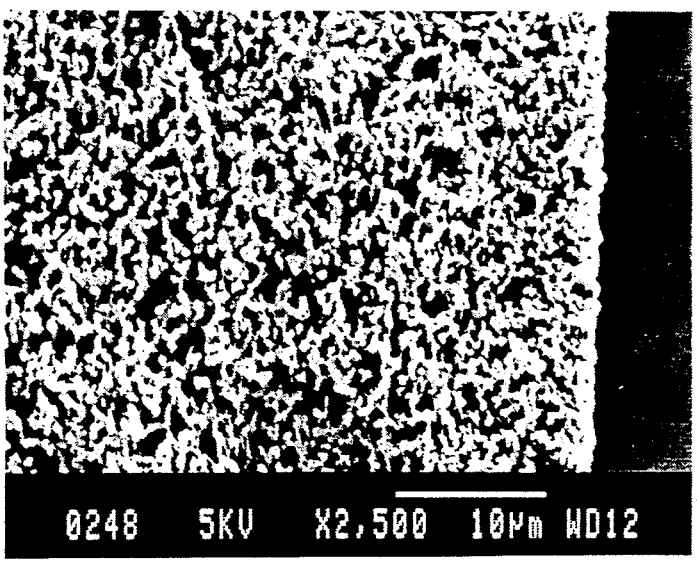
Figure 27:
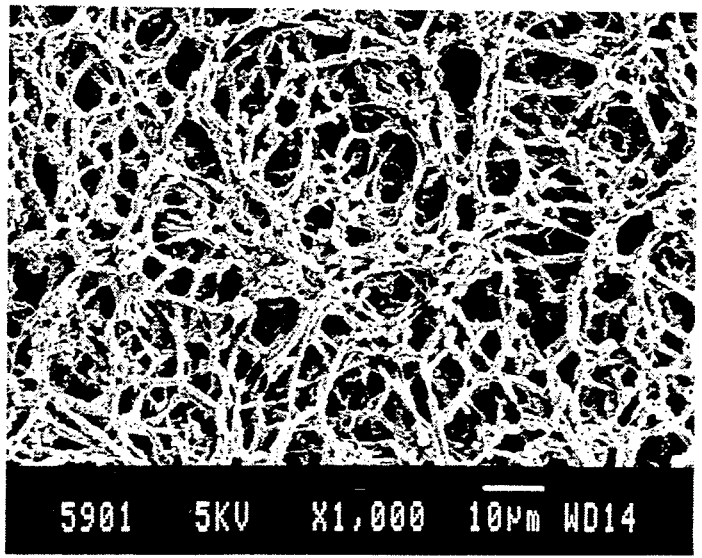
FIGS. 27 and 28 are electron microscope photographs illustrating textures of flat-film-type porous membranes used for comparative experiments.
Figure 28:
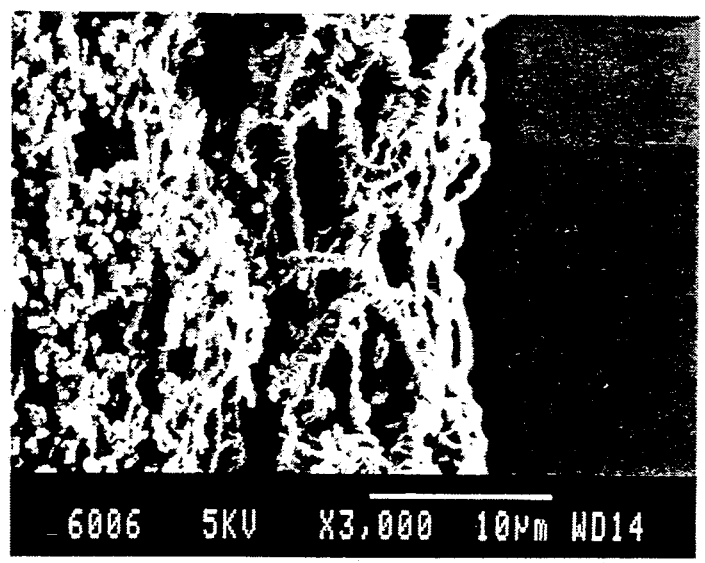

The flat-film type porous polypropylene membrane of the present invention is a flat-film type porous membrane formed substantially with polypropylene in a wall thickness in the range of 30 to 300 $\mu$m, preferably 60 to 200 $\mu$m. The microstructure of this flat-film type porous polypropylene membrane is variable with the conditions for production of the porous membrane. Generally, however, it is enabled to acquire such a structure as shown by the photographs of FIGS. 25 and 26 taken under a scanning electron micrograph by using, as a cooling and solidifying liquid to be fully described later, a solution exhibiting no compatibility with the organic filler and possessing specific heat capacity in the range of 0.2 to 0.7 cal/g. Specifically, the flat-film type porous polypropylene membrane of this invention possesses a microreticular structure which is formed with interlaced threads each consisting of interconnected particles of polypropylene. In either or both of the opposite surface parts of the membrane, a surface layer of practically the same microreticular structure as in the interior of the membrane is formed. The flat-film type porous polypropylene membrane of this invention possesses pores such that the pores in the interior thereof have the same diameter as those in the porous membrane obtained by using paraffin as the cooling and solidifying liquid (FIGS. 27 and 28) and the pores in the surface parts thereof, unlike those in the porous membrane using paraffin as the cooling and solidifying liquid, have roughly the same diameter as those in the interior of the membrane. Surprisingly, it has been found that the flat-film type porous polypropylene membrane of this invention which possesses such a microstructure as described above exhibits as high permeation speed and separation ability as the porous membrane obtained by using paraffin, for example, as the cooling and solidifying liquid and has a very remote possibility of inducing occlusion of blood cells or hemolysis in consequence of contact with blood.

In the flat-film type porous polypropylene membrane of the present invention, the pores formed therein are desired to have an average diameter in the range of 0.1 to 5.0 $\mu$m, preferably 0.2 to 3.0 $\mu$m. If the average pore diameter is less than 0.1 $\mu$m, the membrane is liable to exhibit an insufficient permeation speed to the blood plasma and the pores are liable to be clogged. Conversely, if the average pore diameter exceeds 5.0 $\mu$m, the porous membrane has the possibility of permitting not only the blood plasma component but also the blood cell component (erythrocytes leukocytes, and platelets) to permeate therethrough. So long as the average pore diameter falls in the aforementioned range, the porous membrane is capable of passing not less than 95% of the total proteins, namely the blood plasma component, without passing the blood cell component. The term "average pore diameter" as used herein means the average diameter of all the pores contained throughout the entire volume of the membrane as actually measured with a mercury porosimeter and not the average diameter of the pores contained only in the surface layers. In the flat-film type porous polypropylene membrane of the present invention, the bubble point is required not to exceed 2.0 kgf/cm$^2$, preferably 1.8 kgf/cm$^2$. The term "bubble point" as used herein means to define the largest allowable pore diameter of the membrane. If the bubble point exceeds 2.0 kgf/cm$^2$, the pores in the membrane have too small diameters for the porous membrane to fit speedy filtration of blood plasma and exhibit sufficient permeability to the blood plasma component.

Further, in the flat-film type porous polypropylene membrane of the present invention, the porosity is in the range of 60 to 85%. If the porosity is less than 60%, the porous membrane is liable to exhibit insufficient permeability and offer no sufficient blood plasma separation speed. Conversely, if the porosity exceeds 85%, the porous membrane to be produced is liable to acquire no sufficient working strength. Further in the flat-film type porous polypropylene membrane of the present invention, the amount of water to be passed therethrough is required to exceed 100 ml/min.mmHg.cm$^2$, preferably 140 ml/min.mmHg.cm$^2$. If the amount of water passed therethrough is less than 100ml/min.mmHg.cm$^2$, the porous membrane is liable to offer no sufficient blood plasma separation speed. The flat-film type porous polypropylene membrane of this invention is required to have a wall thickness in the range of 30 to 300 $\mu$m. If the wall thickness is less than 30$\mu$m, the porous membrane is liable to be deficient in strength. conversely, if the wall thickness exceeds 300$\mu$m, the module to be obtained by incorporating a multiplicity of such porous membranes is liable to occupy too large a volume to suit practical use.

The shrinkage which the flat-film type porous polypropylene membrane of this invention exhibits after 120 minutes' heat treatment at 121° C. is required not to exceed 6.0%, preferably 3.0%. The expression "120 minutes' heat treatment at 121° C." represents the high-pressure steam sterilization specified by the Japanese Pharmacopoeia. The term "shrinkage" as used herein means the degree of change in amount of the porous membrane before and after the aforementioned heat treatment. Since the flat-film type porous polypropylene membrane of the present invention is a flat film in shape, the foregoing requirement dictates that the change to be brought about by the heat treatment in the length of the porous membrane in the direction perpendicular to the axis of molding should be not more than 6.0%. If the shrinkage exceeds 6.0%, the porous membrane is liable to offer no sufficient separation of the blood component because of decrease in the amount of water to be passed and decrease in the blood plasma separation speed.

Method for Production of Flat-Film type Porous Polypropylene Membrane

The flat-film type porous polypropylene membrane of the present invention which possesses the characteristic properties described above is produced, for example, as follows.

Figure 23:
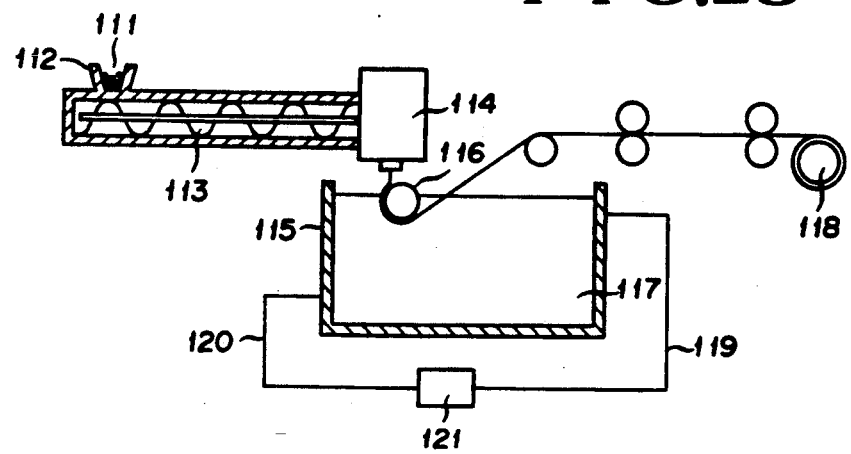
FIG. 23 is a schematic diagram illustrating a typical apparatus to be used in working the method of production of flat-film type porous polypropylene membrane of this invention.

As illustrated in FIG. 23, a composition 111 consisting of polypropylene, an organic filler, and a crystalline seed forming agent is fed through a hopper 112 to a mixer such as, for example, a twin-screw extruder 113 to be melted and blended therein and extruded therefrom, forwarded to a T die 114, discharged in the form of a flat film therefrom, brought down toward a guide roller 116 disposed inside a cooling tank 115 holding therein a cooling and solidifying liquid 117 and allowed to contact the guide roller 116 at a level higher than the surface of the cooling and solidifying liquid 117, and then led into the cooling and solidifying liquid 117 by the rotation of the guide roller 116. In this embodiment, the contact of the molten membrane with the cooling and solidifying liquid is effected by use of the guide roller. Optionally, the molten membrane may be discharged directly into the cooling and solidifying liquid instead. The molten membrane is completely cooled and solidified while it is travelling through the interior of the cooing tank 115 and then taken up on a takeup roller 118. In this while, the cooling and solidifying liquid 117 which is supplied via a line 119 is discharged via a line 120, then cooled to a prescribed temperature by a cooling device (such as, for example, a heat exchanger) 121, and recycled. The membrane taken up as described above was then led into an extraction tank (not shown) filled with an extractant, there to be deprived of the organic filler by extraction. The membrane emanating from the extraction tank, when necessary, is subjected to re-extraction, drying, and heat treatment, for example, before it is rewound. For the purpose of stabilizing the construction and the permeation property of the porous membrane to be produced the membrane is desired to be subjected to the heat treatment as fixed in a prescribed length. The extraction of the organic filler from the membrane may be effected by the use of an extraction tank disposed before the step of the rewinding.

The polypropylene to be used as one of the raw materials in the method of this invention need not be limited to homopolymer of propylene. It may be a block copolymer using propylene as the main component and additionally incorporating therein another monomer (such as, for example, polyethylene). Desirably, the polypropylene is required to possess a melt index (M.I.) in the range of 5 to 70, preferably 5 to 40. Further for the purpose of enhancing the strength of the membrane, the polypropylene to be used in the composition is desired to have a large molecular weight, namely, a low M.I. For example, a mixture consisting of a species of polypropylene having a M.I. in the range of 5 to 40 and 0 to 50% by weight of another species of polypropylene having a M.I. in the range of 0.05 to 5 is used to advantage. In all the species of polypropylene enumerated above, the homopolymer of propylene proves to be particularly advantageous, especially so where the homopolymer possesses high crystallinity.

The organic filler is required to be uniformly dispersible in the polypropylene which is in a molten state and to be easily soluble in an extractant to be used later. Examples of the filler which fulfills this requirement include liquid paraffin (number average molecular weight 100 to 2,000), α-olefin oligomers [such as, for example, ethylene oligomer (number average molecular weight 100 to 2,000), propylene oligomer (number average weight 100 to 2,000), and ethylene oligomer (number average molecular weight 100 to 2,000)], paraffin wax (number average molecular weight 200 to 2,500), and various hydrocarbons. On the organic fillers enumerated above, the liquid paraffin proves to be particularly desirable.

The mixing ratio of the polypropylene and the aforementioned organic filler is such that the proportion of the organic filler to 100 parts by weight of the propylene is in the range of 200 to 600 parts by weight, preferably 300 to 500 parts by weight. If the proportion of the organic filler is less than 200 parts by weight, the flat-film type porous polypropylene membrane to be produced possesses unduly low porosity and water permeability and fails to acquire sufficient permeation properties. If this proportion exceeds 600 parts by weight, the produced membrane exhibits unduly low viscosity and deficiency in workability. For the formulation of raw materials mentioned above, the mixture consisting of raw materials in a prescribed percentage composition is prepared (designed) by the premix method which comprises melting and blending the mixture, extruding the resultant blend, and pelletizing the extruded blend by the use of biaxial type extruding machine, for example.

The crystalline seed forming agent to be included in the raw materials for this invention is an organic heat-resistant substance possessing a melting point of not less than 150° C., preferably in the range of 200° to 250° C., and a gelling point of not less than the crystallization starting point of polyolefin. The crystalline seed forming agent of this description is used as one of the raw materials for the purpose causing contraction of the particles of polypropylene thereby controlling the gap between the solid phases, namely the diameter of micropores to be formed. As examples of the crystalline seed forming agent, there can be cited 1,3,2,4-dibenzylidene sorbitol, 1,3,2,4-bis(p-methylbenzylidene) sorbitol, 1,3,2,4-bis(p-ethylbenzylidene)sorbitol, bis(4-t-butylphenyl)sodium phosphate, sodium benzoate, adipic acid, talc and kaoline. Among other crystalline seed forming agents enumerated above, 1,3,2,4-dibenzylidene sorbitol, 1,3,2,4-bis(p-ethylbenzylidene) sorbitol, and 1,3,2,4-bis(p-methylbenzylidene) sorbitol prove to be advantageous because they do not appreciably dissolve out into the blood.

The mixing ratio of the propylene and the aforementioned crystalline seed forming agent is such that the proportion of the crystalline seed forming agent to 100 parts by weight of the polypropylene is in the range of 0.1 to 5 parts by weight, preferably 0.2 to 1.0 part by weight.

As the cooling and solidifying liquid for this invention a solution exhibiting no compatibility with the organic filler is used which possesses a specific heat capacity in the range of 0.2 to 0.7 cal/g, preferably 0.3 to 0.6 cal/g. As concrete examples of the cooling and solidifying liquid, there can be cited polyethers such as polyethylene glycol and water-soluble paraffins which are insoluble in the organic filler. Among other cooling and solidifying liquids enumerated above, various species of polyethylene glycol prove to be particularly advantageous, especially so when their average molecular weights fall in the range of 100 to 400. The species of polyethylene glycol possessing an average molecular weight in the range of 180 to 330 proves to be the most desirable selection. Such a liquid as exhibiting no compatibility with the organic filler being used and possessing a specific heat capacity in the range of 0.2 to 0.7 cal/g is used as the cooling and solidifying liquid for the following reason.

When a compound identical or similar to the aforementioned organic filler is used as the cooling and solidifying liquid, namely when a species of liquid paraffin is used as the organic filler and another species of liquid paraffin possessing number average molecular weight approximating that of the first species of liquid paraffin is used as the cooling and solidifying liquid, the produced membrane is enabled to contain pores in a prescribed density without entailing any appreciable migration of the organic filler in the molten membrane. Further, since the specific heat is not unduly large, the polypropylene is crystallized smoothly at a proper cooling speed to form particles stably. During the course of this cooling, the polypropylene dissolves out into the cooling and solidifying liquid before the polypropylene in the surface parts is solidified. As the result, a very large reticular structure is formed in the surface parts. When an inactive liquid exhibiting no compatibility with the organic filler and possessing a large specific heat capacity of about 1.0 cal/g, is used as the cooling and solidifying liquid, the polypropylene is quickly cooled, the phase separation between the polypropylene is quickly cooled the phase separation between the polypropylene does not sufficiently proceed, and the pores in the surface parts and those in the interior of the membrane are both small and the porosity of the membrane is low because the cooling effect of the liquid is high.

In contrast, when a liquid exhibiting no compatibility with the aforementioned organic filler and possessing a specific heat capacity in the range of 0.2 to 0.7 cal/g is used as the cooling and solidifying liquid, the propylene is not suffered to dissolve out in the surface parts, the cooling speed of the polypropylene is proper, and the polypropylene is smoothly crystallized even in the surface parts with the composition ratio thereof retained intact. As the result, there can be formed a reticular structure which is not enlarged unduly even in the surface parts and which is enabled to contain amply large pores fit for blood plasma separation even within the interior thereof.

The temperature of the cooling and solidifying liquid is desired to be in the range of 10° to 80° C., preferably 30° to 60° C., for the following reason. If this temperature is less than 10° C., the cooling and solidifying speed is so fast that the micropores to be formed consequently have a very small diameter. Conversely, if the temperature exceeds 80° C., the cooling and solidifying treatment does not proceed amply and the molten membrane is liable to break in the cooling and solidifying liquid.

The membrane which has been thoroughly cooled and solidified in the cooling and solidifying tank is brought into contact with the extractant to permit removal of the organic filler therefrom by extraction. This solution and extraction of the organic filler may be effected by the extraction tank method or the shower method which comprises advancing the membrane on a belt conveyor and causing the extractant to fall in the form of shower onto the membrane in motion.

As the extractant, any liquid can be used on the sole condition that it should be incapable of dissolving the polypropylene forming the backbone of the porous membrane and capable of dissolving and extracting the organic filler. Examples of the liquid answering the description include such halogenated hydrocarbons as tetrachloromethane, 1,1,2-trichloro-1,2,2-trifluoroethane, trichlorofluoromethane, dichlorofluoromethane, 1,1,2,2-tetrachloro-1,2-difluoroethane, trichloroethylene, and perchloroethylene. In the liquids enumerated above, chlorofluorinated hydrocarbons prove to be desirable in terms of ability to extract the organic filler and safety in the human system. Where a sorbitol is used as the crystalline seed forming agent, a ketone may be incorporated in the extractant so as to remove the sorbitol from the porous membrane during the course of extraction and thereby to preclude the otherwise possible exudation of the sorbitol from the surface of the porous membrane after the molding.

The flat-film type porous polypropylene membrane which is obtained as described above, when necessary, may be further subjected to a heat treatment. This heat treatment is carried out at a temperature 10° to 15° C. lower than the melting point of the polypropylene, specifically a temperature in the range of 110° to 150° C., preferably 130° to 140° C., for a period in the range of 30 to 180 seconds, preferably 60 to 20 seconds. Preparatory to the heat treatment, the porous membrane must be fixed in a prescribed length. The flat-film type porous polypropylene membrane which is produced as described above is useful as a membrane for the separation of blood into blood cells and blood plasma and as a microfilter for the removal of bacteria from blood. It is used particularly advantageously as a membrane for the separation of blood plasma where the separated blood plasma is put to use as in the treatment of donorpheresis.

EXAMPLE

As an aid for further facilitating the comprehension of this invention, a few working examples will be cited below. These examples are offered purely for the purpose of illustrating this invention and are not meant to restrict the scope of this invention in any respect.

EXAMPLES 1 AND 2 AND CONTROLS 1 THROUGH 3

In a twin-screw extruder (produced by Ikeqai Iron Works, Ltd. and marketed under trademark designation of PCM-30-25), 100 parts by weight of propylene homopolymer possessing a melt index (M.I.) of 23, a varying proportion of liquid paraffin (number average molecular weight 324) indicated in Table 1, and 0.5 part by weight of dibenzylidene sorbitol were melted and blended and extruded. The extruded mixture was pelletized. By the use of a device illustrated in FIG. 20, namely a single screw extruder (produced by kasamatsu Seisakusho and marketed under produce code "WO-30"), the pellets were melted at a varying temperature indicated in Table 1 and discharged through an annular spinning hole possessing a core diameter of 4 mm, an inside diameter of 6 mm, an outside diameter of 7 mm, and a land length of 15 mm at a varying discharge volume indicated in Table 1 into the air to cause fall of a continuous hollow thread 16. The distance of this fall was varied as shown in Table 1. Then, the hollow thread 16 was brought into contact with a varying cooling and solidifying liquid indicated in Table 1 held in a cooling tank 18 and then cooled by parallel-flow contact with the cooling and solidifying liquid 17 spontaneously flowing down the interior of the cooling and solidifying liquid flow tube 19. In this case, the temperature of the cooling and solidifying liquid was varied as shown in Table 1. Then, the aforementioned hollow thread 16 was led into the cooling and solidifying liquid inside a solidification tank 20, caused to change the course of its travel by a deflection bar 21, then led to a drive roll 22 operated at a varying winding speed indicated in Table 1, continuously treated on a shower conveyor type extracting machine 27 with Freon 113 (1,1,2-trichloro-1,2,2-trifluoroethane) to effect through removal of the aforementioned liquid paraffin by extraction, passed around a drive roll 22, passed through a heat-treating device 30 under varying temperature and time conditions indicated in Table 1, and taken up on a bobbin 32 by a winder 31. Then hollow fiber thus taken up on the bobbin 32 was rewound on a skein by a rewinding device to obtain a hollow fiber bundle about 30 cm in length. The hollow fiber membrane thus obtained was examined with respect to shape (wall thickness), porosity, opening ratio in the inner surface, gas flux, ability to add oxygen gas, ability to remove carbon dioxide gas, leakage of blood plasma, and speed of blood plasma permeation. The results are shown in Tables 2 and 3.

Figure 8:
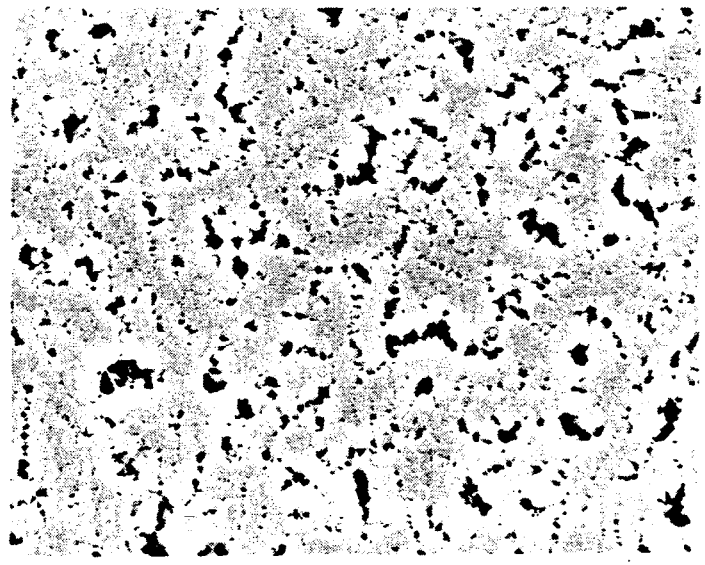
Figure 9:
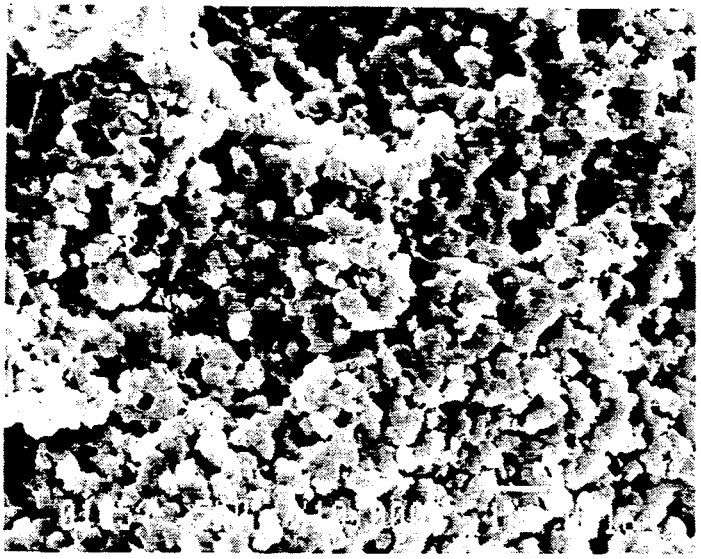
Figure 10:
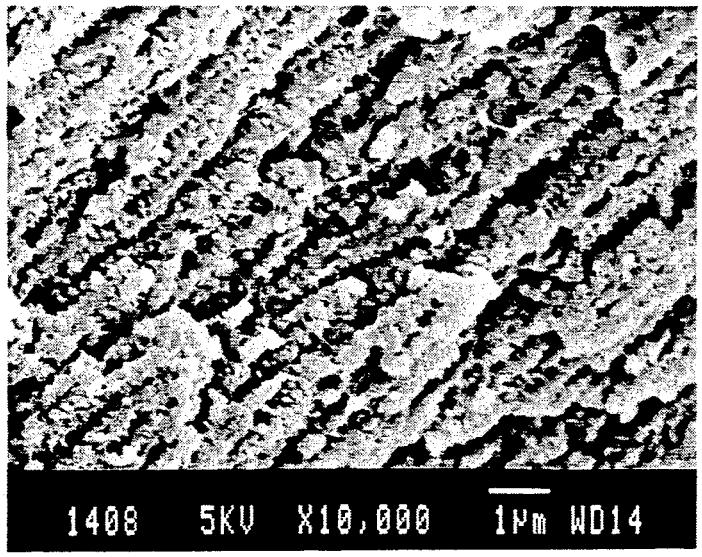
Figure 12:
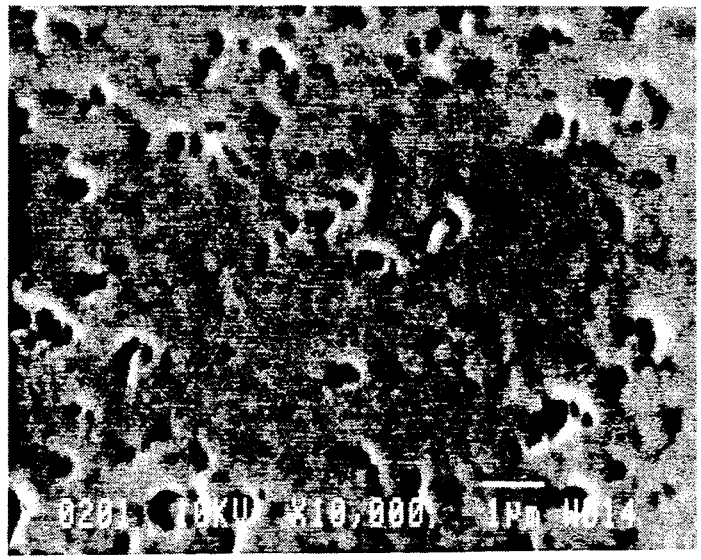
Figure 13:

To determine the microstructure of the hollow fiber membrane obtained, various portions of the hollow fiber membrane were observed under a scanning electron microscope (produced by JEOL and marketed under product code of "JSM-840"). Specifically, FIG. 1 is a photomicrograph of the outer surface ($\times 10,000$) of the hollow fiber membrane of Example 1, FIG. 2 of the inner surface ($\times 10,000$) of the hollow fiber membrane of Example 1, FIG. 3 of the cross section ($\times 10,000$) of the hollow fiber membrane of Example 1, FIG. 4 of the longitudinal cross section ($\times 10,000$) of the hollow fiber membrane of Example 1, FIG. 5 of the outer surface ($\times 10,000$) of the hollow fiber membrane of Example 2, FIG. 6 of the inner surface ($\times 10,000$) of the hollow fiber membrane of Example 2, FIG. 7 of the outer surface ($\times 10,000$) of the hollow fiber membrane of Control 1, FIG. 8 of the inner surface ($\times 10,000$) of the hollow fiber membrane of Control 1, FIG. 9 of the cross section (×10,000) of the hollow fiber membrane of Control 1, FIG. 10 of the longitudinal cross section (×10,000) of the hollow fiber membrane of Control 1, FIG. 11 of the outer surface (×10,0000) of the hollow fiber membrane of Control 2, FIG. 12 of the inner surface (×10,000) of the hollow fiber membrane of Control 2, FIG. 13 of the cross section (×3,000) of the hollow fiber membrane of Control 1, FIG. 14 of the outer surface (×3,000) of the hollow fiber membrane of Control 3, and FIG. 15 of the cross section (×3,000) of the hollow fiber membrane of Control 3, respectively taken under an electron microscope. In each of the microphotographs, the direction of axis of fibers in the relevant hollow fiber membrane is shown on the right.

The hollow fiber membranes of Example 1 and Control 1 were tested for ratio of birefringence as an index of crystal orientation. The results are shown in Table 4.

Modules of the type adapted to pass blood outside hollow fiber membranes were assembled with the hollow fiber membranes of Example 1 and Control 1 and tested for hemolysis of blood and pressure loss of blood. The results are shown in Table 5.

Control 4

Figure 16:
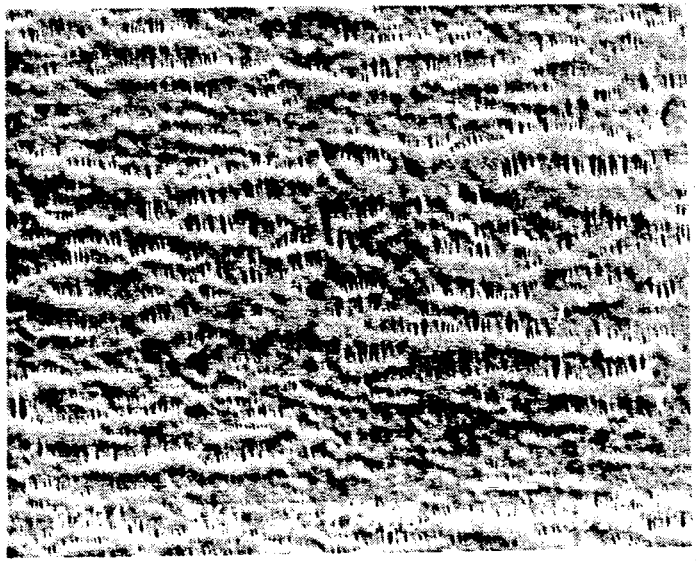
Figure 16:
Figure 17:
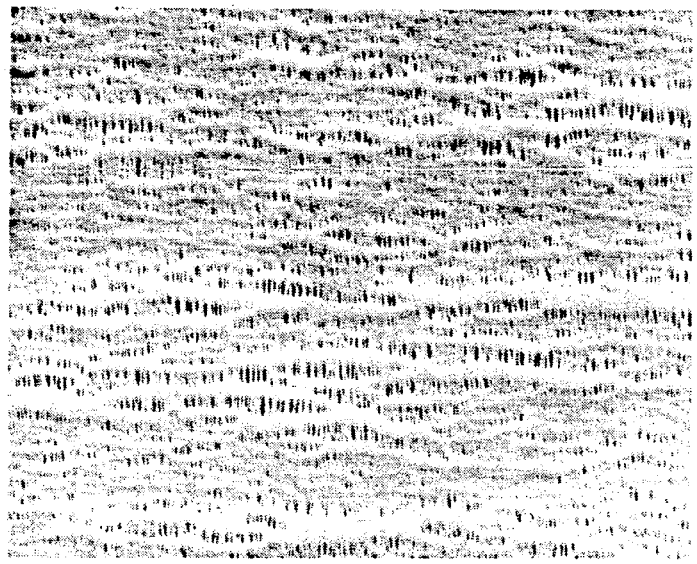
Figure 18:
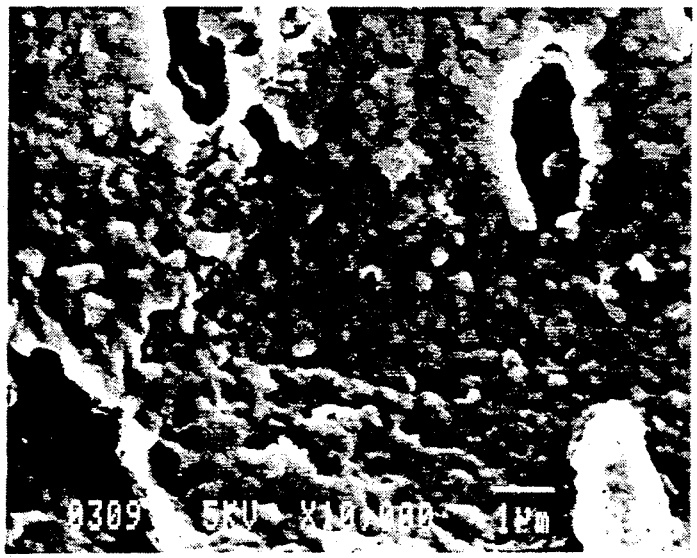
Figure 19:
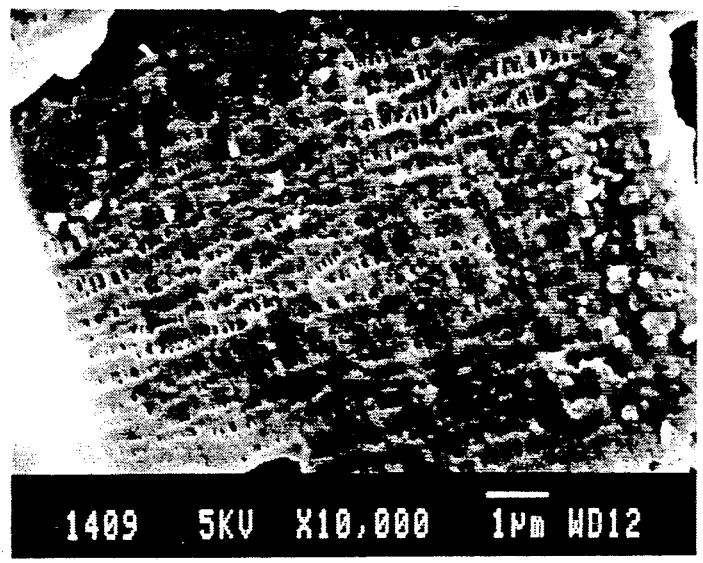

For the purpose of comparison, a commercially available artificial lung-grade polypropylene hollow fiber membrane produced by the stretching method was tested for shape (inside diameter/wall thickness), porosity, opening ratio in inner surface, gas flux, ability to add oxygen gas, ability to remove carbon dioxide gas, leakage of blood plasma, and blood plasma permeation speed in the same manner as in Examples 1 and 2 and Controls 1 through 3. The results are shown in Tables 2 and 3. The microstructure of the hollow fiber membrane was observed under a scanning electron microscope (made by JEOL and marketed under product code of "JSM-840"). FIG. 16 is a photomicrograph of the outer surface (×10,000) of this hollow fiber membrane, FIG. 17 of the inner surface (×10,000) thereof, FIG. 18 of the cross section (×10,000) thereof, and FIG. 19 of the longitudinal cross section (×10,000) thereof, taken under the electron micrograph. In each of these figures, the direction of axis fibers in the hollow fiber membrane is shown on the right.

The hollow fiber membrane was tested for ratio of birefringence as an index of crystal orientation. The results are shown in Table 4. A module of the type adapted to pass blood outside the hollow fiber membrane was assembled using the hollow fiber membrane and tested for hemolysis of blood and pressure loss of blood in the same manner as in Example 1 and Control 1.

TABLE 1

|  | Melting point (°C.) | Liquid paraffin content in raw material (part by weight) | Cooling and solidifying liquid | Temperature of cooling and solidifying liquid (°C.) | Distance of fall (mm) | Amount discharged (g/min) | Winding speed (m/min) | Heat treatment Temperature (°C.)/time (sec) |
| --- | --- | --- | --- | --- | --- | --- | --- | --- |
| Example 1 | 180 | 120 | Polyethylene glycol (Mn = 200) | 50 | 35 | 3.43 | 80 | 100–110/19 |
| Example 2 | 180 | 120 | Polydimethyl siloxane (TORAY SILICONE SH 200, 20 cSt) | 50 | 30 | 3.66 | 80 | 100–110/19 |
| Control 1 | 180 | 120 | Liquid paraffin (Mw = 299) | 35 | 30 | 3.60 | 80 | 100–110/19 |
| Control 2 | 210 | 60 | 1,1,2-trichloro-1,2,2-trifluoroethane | 27 | 24 | 2.76 | 100 | 70–80/15 |
| Control 3 | 200 | 80 | Water | 35 | 30 | 7.6 | 170 | 70–80/15 |

TABLE 2

|  | Shape Inside diameter/Wall thickness (μm) | Gas flux (lit/min.m².atm) | Porosity (%) |
| --- | --- | --- | --- |
| Example 1 | 200/45 | 432 | 41.1 |
| Example 2 | 200/45 | 361 | 42.8 |
| Control 1 | 200/45 | 416 | 38 |
| Control 2 | 209/26 | 16.9 | 17.8 |
| Control 3 | 177/44 | 0 | — |
| Control 4 | 200/25 | 1200 | 45 |

TABLE 3

|  | Opening ratio in inner surface (%) | Ability to add oxygen gas (m./min.m²) | Ability to remove carbon dioxide gas (ml/min.m²) | Leakage of blood plasma | Blood plasma permeating speed (ml/min.m².atm) |
| --- | --- | --- | --- | --- | --- |
| Example 1 | 16.0 | 42.1 | 45.0 | No sign of leakage after 30 hours | 116 |
| Control 1 | 17.6 | 40.9 | 47.6 | No sign of leakage after 30 hours | 73.8 |
| Control 2 | 5.1 | 29.6 | 43.3 | False positive reaction after 30 hours | 42.5 |
| Control 3 | 20.1 | 41.8 | 49.8 | First sign seen after 17 hours and heavy leakage after 20 hours. | 332 |

TABLE 4

|  | Ratio of birefringence(Δn) |
| --- | --- |
| Example 1 | 0.004 |
| Control 1 | 0.003 |
| Control 4 | 0.014 |
| Completely oriented polypropylene | 0.035 (As reported in literature) |

TABLE 5

|  | Hemolysis (amount of free hemoglobin in blood) ΔHb(mg/dl) | Pressure loss Δp (mmHg) |
|---|---|---|
| Example 1 | 53 | 33 |
| Control 1 | 122 | 48 |
| Control 4 | 51 | 32 |

It is clearly noted from the results shown in Tables 2 through 4 that the hollow fiber membranes of Examples 1 and 2 according with the present invention exhibited proper properties for artificial lung-grade hollow fiber membranes as the hollow fiber membrane of Control 1 and possessed smooth outer surface conditions. Thus, even in the modules adapted to circulate blood outside hollow fiber membranes, they induced neither hemolysis nor pressure loss so heavily as the counter type module of Control 1 as noted from Table 5. When the hollow fibers wound on bobbins in Examples 1 and 2 and Controls 1 and 2 were observed, the fibers spun simultaneously in Controls 1 and 2 were liable to cohere fast, whereas the fibers spun in Examples 1 and 2 were found to induce absolutely no such phenomenon. Further in Control 2, the low molecular component of polypropylene adhered to the interior of the cooling bath and continued to accumulate thereon to cause a gradual decrease in the diameter of the tube. In Examples 1 and 2, absolutely no such phenomenon was observed.

Then the cooling and solidifying liquids used in Examples 1 and 2 and Controls 1 through 3 were tested for compatibility with organic filler (liquid paraffin) and specific heat capacity and the hollow fiber membranes produced respectively were observed with respect to the outer surface condition. The results are shown collectively in Table 6.

ene excessively proceeded to give rise to giant lumps of polypropylene. In contrast, when liquids exhibiting no compatibility with liquid paraffin and possessing specific heat in the range of 0.2 to 0.7 cal/g as in Examples 1 and 2, the outer surface of the hollow fiber was smooth and contained pores sufficiently.

The various terms used in the present specification concerning the porous polypropylene hollow fiber membrane and the methods used for the determination of the properties mentioned herein are defined below.

Shape (inside diameter/wall thickness)

The hollow fibers randomly selected from a given lot were cut laterally to obtain rings about 0.5 mm in length with a sharp razor blade. The sections of the rings were projected with a universal projector (produced by Nippon Kogaku K.K. and marketed under trademark designation of "Nikon Profile Projector V-12") and the outside diameters, $d_1$, and inside diameters, $d_2$, of the projected sections were measured with an instrument (produced by Nippon Kogaku K.K. and marketed under trademark designation of "Nikon digital Counter CM-6S") and the wall thicknesses, t, were calculated by the formula, $t=(d_1-d_2)/2$. The numerical values thus obtained with respect to the ten hollow fibers were averaged to be reported.

Porosity (%)

About 2 g of hollow fibers taken from a given lot were cut laterally into rings not more than 5 mm in length with a sharp razor blade. In a mercury porosimeter (produced by and marketed under product code of "65A"), the rings were subjected to a final pressure of 1,000 kg/cm² to find the total amount of pores (volume of pores in a unit weight of hollow fibers) and determine the porosity.

TABLE 6

Figure 5:
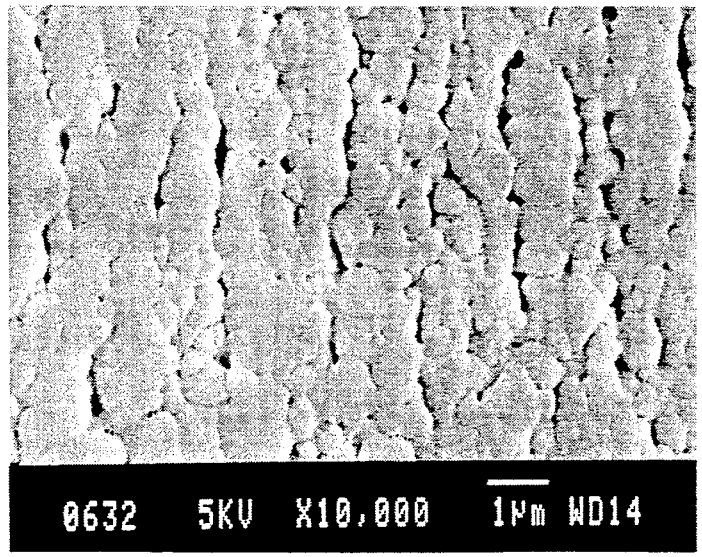
Figure 6:
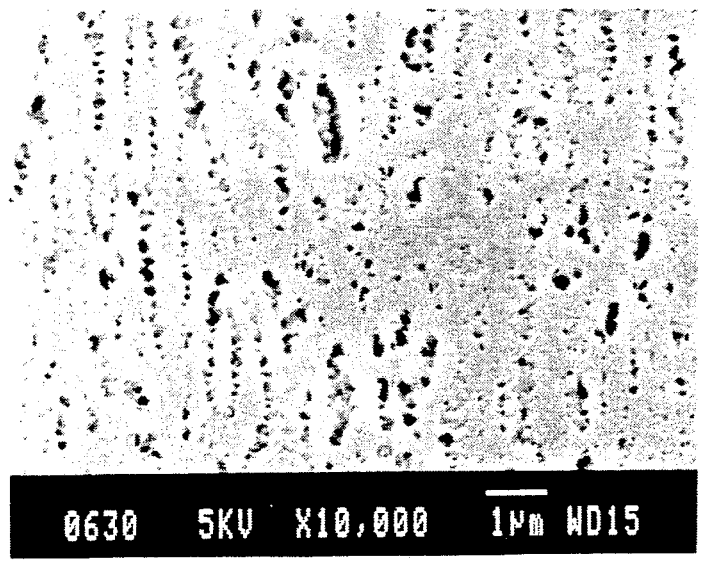
Figure 7:
FIGS. 7 through 19 are electron microscope photographs illustrating textures of conventional porous hollow fiber membranes.
Figure 11:
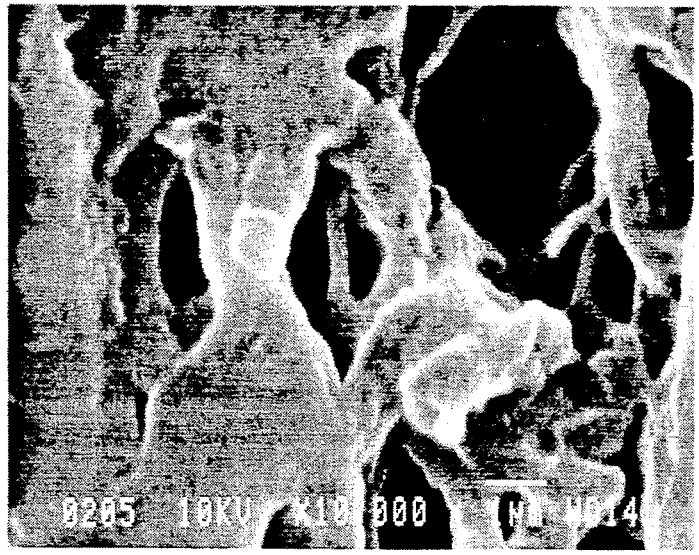
Figure 14:
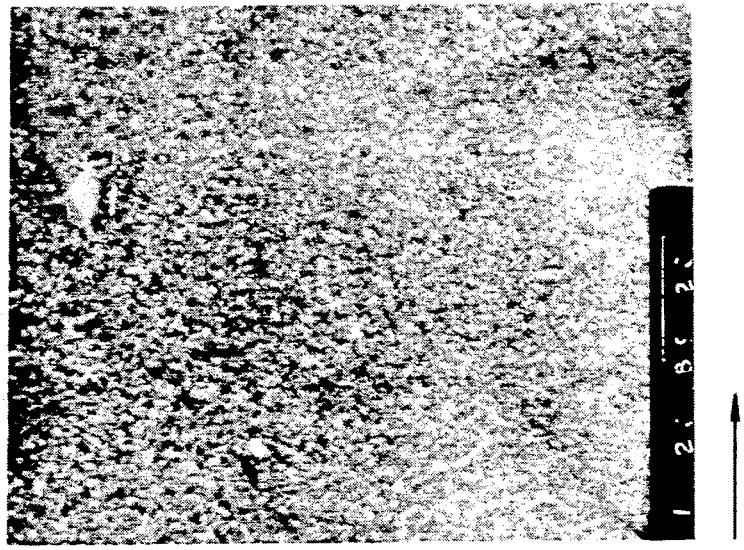
Figure 15:

|  | Cooling and solidifying liquid | Cooling temperature (°C.) | Compatibility with liquid paraffin | Specific heat capacity (cal/g) | Outer surface condition of hollow fiber | Photograph |
|---|---|---|---|---|---|---|
| Example 1 | Polyethylene glycol (Mn = 200) | 50 | X | 0.51 | Orderly arranged particulate polypropylene (0.1 to 0.2 μm) | FIG. 1 |
| Example 2 | Polydimethyl silioxane (Toray Silicone SH 200, 20 cSt) | 50 | X | 0.36 | Orderly arranged particulate polypropylene and ample presence of pores | FIG. 5 |
| Control 1 | Liquid paraffin (Mn = 200) | 35 | O | 0.48 | Particulate polypropylene connected in the form of network (0.1 to 1.0 μm) | FIG. 7 |
| Control 2 | Freon 113 | 27 | O | 0.21 | Lumps of polypropylene interconnected in the form of network (several μm) | FIG. 11 |
| Control 3 | Water | 35 | X | 1.0 | Skin layer of polypropylene | FIG. 14 |

O compatible
X incompatible

It is noted from Table 6 that when a cooling and solidifying liquid exhibiting compatibility with liquid paraffin serving as an organic filler was used, a solid phase of polypropylene in the outer surface formed a continuous network and imparted heavy ruggedness to the surface. When water was used, the polypropylene was quickly cooled and suffered to form a skin layer of polypropylene because the water possessed an excessively large specific heat capacity in spite of incompatibility with liquid paraffin. When the specific heat capacity was so small as that of 1,1,2-trichloro-1,2,2-trifluoroethane (Freon 113), the polypropylene was cooled so slowly that the crystallization of polypropyl-

Aperture ratio of inner surface (%)

The inner surface of a given hollow fiber was photographed under a scanning electron microscope (produced by JEOL and marketed under product code of "JSM-840") at 3,000 magnifications. The photograph was enlarged on a quarter printing paper (about 7,500 magnifications on the printing paper). On the product print, four linear lines were randomly drawn each in the direction of axis of fibers and the direction perpendicular thereto. The ratio of the sum of lengths of pores intersected by the linear lines to the total length of the linear lines was reported as the aperture ratio of the inner surface.

Oxygen gas flux

A miniature module 14 cm in available length and 0.025 m² in membrane surface was produced using given hollow fibers. With one end of the module tightly closed, 1 atmosphere of oxygen pressure was applied on the interior of hollow fibers. After the system assumed the steady state, the flow volume of oxygen gas was read from the flow meter (produced by Kusano Rikagakukiki Seisakusho and marketed under trademark designation of "Floatmeter") and reported as oxygen gas flux.

Ability to add oxygen gas and ability to remove carbon dioxide gas

An artificial lung module 130 mm in available length and 1.6 m² of membrane surface was produced using given hollow fibers. Via a single path, bovine blood (standard venous blood) was passed at a flow volume of 1.6 liters/min. inside hollow fibers and pure oxygen was passed at a flow volume of 1.6 liters/min. outside the hollow fibers. In this while, the bovine blood was tested for pH, carbon dioxide partial pressure ($P_{CO_2}$), and oxygen gas partial pressure ($P_{O_2}$) at the inlet and outlet of the artificial lung with an instrument (produced by Radiometer Corp. and marketed under product code of "BGA3") and the differences of partial pressure at the inlet and outlet of the artificial lung.

Further details on the use of the artificial lung module are shown in Table 7. The attributes of the standard arterial blood are shown in Table 8.

TABLE 7

| | Membrane surface (m²) | Inside.outside diameter (μm) | Number of hollow fibers | Available length/total length (cm) | Packing ratio* (%) | | |
|---|---|---|---|---|---|---|---|
| | | | | | Part A | Part B | Part C |
| Examples 1 and 2 and Control 1 | 1.6 | 200/290 | 19700 | 13/16 | 60 | 50 | 43 |
| Control 4 | 1.6 | 200/245 | 19700 | 13/16 | 64 | 42 | 33 |

*The term "packing ratio" means the ratio of the cross-sectional area (inclusive of empty spaces) of hollow fiber membrane to the cross-sectional area inside the cylinder proper in a varying part indicated in FIG. 22.

TABLE 8

| | |
|---|---|
| Blood | Fresh heparin-added bovine blood |
| Hematocrit value | 35% (as prepared with physiological Saline solution) |
| Hemoglobin concentration | 12 ± 1 g/dl |
| Base Excess | 0 ± 2 mEq/liter (as prepared with sodium hydrogen carbonate) |
| Degree of oxygen saturation | 65 ± 5% |
| Carbon dioxide partial pressure | 45 ± 5 mmHg |
| Temperature | 37 ± 2° C. |

Leakage of blood plasma

An artificial lung module similar to that used for the determination of the ability to add oxygen gas and the ability to remove carbon dioxide gas was prepared, inserted in a partial V-A bypass circuit established by the jugular vein-jugular artery cannulation in a mongrel dog (weighing about 20 kg), and used for 30 minutes extracorporeal circulation of blood to measure the amount of blood plasma leaking from within the hollow fibers. Where there was no discernible leakage of blood plasma, drops of steam condensate formed outside the hollow fibers were tested for protein reaction to ensure detection of even slight leakage of blood plasma.

Blood plasma permeation speed

A miniature module similar to that used for the determination of gas flux was prepared, successively immersed in aqueous 100%, 80%, 50%, and 0% ethanol solution, for 2 hours each. The blood plasma obtained by centrifuging bovine blood was circulated through this miniature module with the intermembranous pressure (TMP) adjusted to 0.225 kg/cm². The amount of blood plasma which had permeated the membrane was measured with a measuring cylinder.

Ratio of birefringence ($\Delta n$) (retardation method)

From 10 hollow fiber membranes randomly extracted from a given lot, central portions 3 cm in length were cut out. The segments thus obtained had their ends on one side cut aslant and used as a sample. The hollow fiber membranes thus prepared were placed on a slide glass, wetted with an immersing liquid (liquid paraffin), and the slide glass thus prepared was set on a rotary stage in a polarizing microscope. With a monochromatic light source or a light source equipped with a filter as substitute, under a cross nicol exclusive of a compensator, the specimen on the rotary stage was rotated to the brightest position (reached by a 45° rotation from the darkest position) and immobilized at this brightest position. Then, the compensator was inserted, and the analyzer was rotated to find the angles producing the darkest ($\theta$) black, and the retardation (R) was calculated in accordance with the formula represented below. Further the ratio of birefringence of the hollow fiber membrane was calculated in accordance with the following formula. The average of the numerical values obtained for 10 samples was reported.

$$\text{Retardation } R = \frac{\theta}{180} \lambda$$

wherein λ stands for the wavelength of light used.

$$\text{Ratio of birefringent} = \Delta n = \frac{R}{d}$$

wherein d stands for the thickness of sample (compensated with the porosity),

| Conditions of determination: | |
|---|---|
| Polarizing microscope | Nikon OPTIPHTO-POL |
| Wavelength of Light source | 546 nm |
| Compensator | Senarmont type compensator |

Incidentally, completely oriented polypropylene has been reported in literature to possess a ratio of birefringence n, of 0.35.

Hemolysis and pressure loss

An artificial lung module of the mode adapted to circulated blood outside hollow fiber membranes and satisfying the specification shown in Table 9 was prepared using given hollow fiber membranes and used for 6 hours' circulation of fresh heparin-added bovine blood to determine the amount of free hemoglobin in the blood by the TMB method. The condition of hemolysis in the blood was rated by comparing the amount of free hemoglobin mentioned with that obtained by circulating the same bovine blood through a circuit incorporating no artificial lung. During the operation of the module, the pressure loss was measured before and after the artificial lung.

TABLE 9

| | |
|---|---|
| Number of hollow fiber membranes | 48,160 |
| Available length | 80 mm |
| Overall length | 135 mm |
| Packing ratio in the central part (Part A) | 48% |

EXAMPLES 3 THROUGH 5 AND CONTROLS 5 THROUGH 7

By the use of a twin-screw extruder (produce by Ikegai Iron Works, Ltd. and marketed under trademark designation of PCM-30-25), 100 parts by weight of a mixture of two polypropylene species possessing melt flow indexes of 30 and 0.3 (mixing ratio 100:40 by weight), varying proportions of liquid paraffin (number average molecular weight 324), and 1,3,2,4-bis(p-ethylbenzylidene)sorbitol as a crystalline seed forming agent indicated in Table 10 were melted and kneaded and pelletized. By the aforementioned extruder, the pellets were melted at a varying temperature in the range of 150° to 200° C., extruded through a T die 0.6 mm in slit width into the air, allowed to fall onto a guide roller in a cooling liquid tank disposed directly below the T die, led into the cooling and solidifying liquid by the rotation of the roller to be cooled and solidified therein, and thereafter taken up. The kind and temperature of the cooling and solidifying liquid used in this case were as shown in Table 1. From the film thus taken up, a square (about 200 x 200 mm) was cut off, fixed in both the longitudinal and lateral directions, immersed four times in 1,1,2-trichloro-1,2,2-trifluoroethane (liquid temperature 25° C.) for 10 minutes each to effect expulsion of the liquid paraffin, and then heat treated in the air at 135° C. for 2 minutes.

The flat-film type porous polypropylene membrane consequently obtained was tested for wall thickness, bubble point, porosity, water permeation, and highest blood plasma separation speed. The results are shown in Table 10.

Then, to determine the microstructure of the flat-film type porous polypropylene membrane, various portions of the membrane were observed under a scanning electron microscope (produced by JEOL and marketed under product code of "JSM-840"). FIG. 25 is a photomicrograph of the surface ($\times 1,000$) of the flat-film type porous polypropylene membrane of Example 1, FIG. 26 of the partial cross section ($\times 2,500$) of the flat-film type porous polypropylene membrane of Example 3, FIG. 27 of the surface ($\times 1,000$) the flat-film type porous polypropylene membrane of Control 5, and FIG. 28 of the partial cross section ($\times 3,000$) of the flat-film type porous polypropylene membrane of Control 1, respectively taken under the electron microscope. It is clearly noted from FIG. 25, and FIG. 26 that the flat-film type porous polypropylene membrane of Example 3 according with the present invention possessed practically equal reticular structure in the surface parts and in the interior of the membrane, the surface layers had a virtually negligible thickness (about 0.5% of the total membrane thickness), and the reticular structure had attained full development even in the interior of the membrane. In contrast, the flat-film type porous polypropylene membrane obtained by using liquid paraffin as the cooling and solidifying liquid (Control 5), as clearly noted from FIG. 27 and FIG. 28, possessed as fully developed a reticular structure in the interior of the membrane as in the membrane of Example 1, possessed fairly rough reticular structure in the surface parts, and had surface layers of a fairly large thickness (about 24.0% of the total thickness of the membrane). The comparison offers a definite evidence that the flat-film type porous polypropylene membrane of Example 3 according with the present invention suffered sparingly from occlusion of blood cells.

Figure 30:
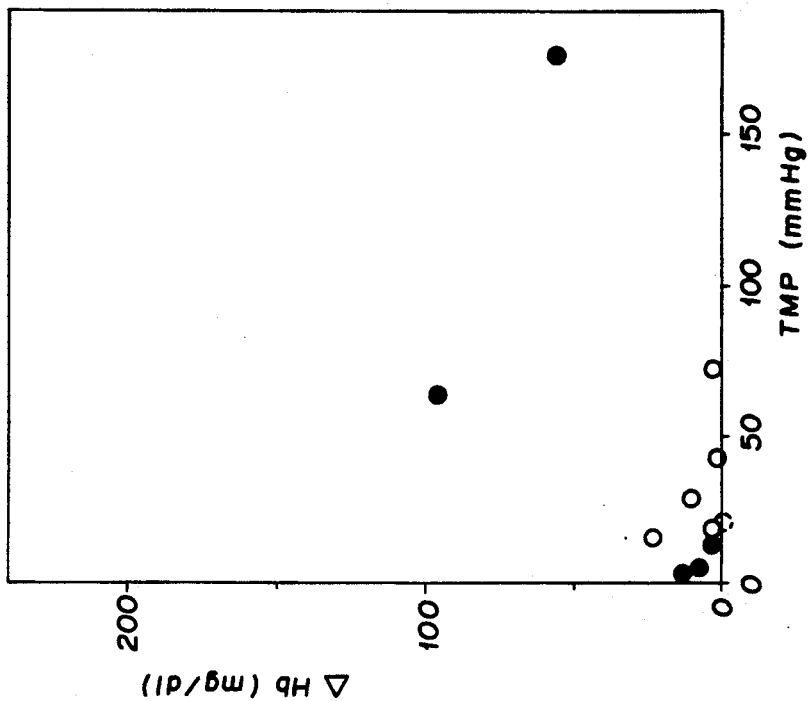
FIG. 30 is a graph showing the relating between the total membrane pressure and the amount of free hemoglobin ($\Delta Hb$).
Figure 29:
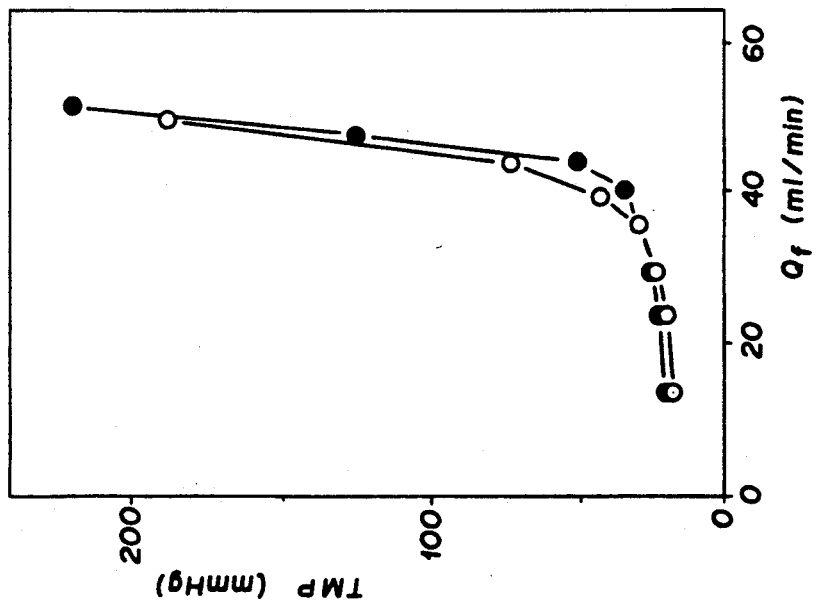
FIG. 29 is a graph showing the relation between the blood plasma separation speed (Qf) and the total membrane pressure (T.M.P.).

Separately, life-size laminate modules severally incorporating therein the flat-film type porous polypropylene membrane of Example 3 and Control 5 were operated to effect blood plasma separation of bovine blood, to compare the flat-film type porous polypropylene membrane in ability of blood plasma separation. Results are shown in FIG. 29–31. FIG. 29 shows the relation between the speed of blood plasma separation (Qf) and the total intermembranous pressure (T.M.P.) and FIG. 30 the relation between the T.M.P. and the amount of free hemoglobin ($\Delta$Hb).

Control 8

For the purpose of comparison, a commercially available cellulose acetate membrane (CA; produced by Toyo Filter Paper Co., ltd.) was similarly tested for thickness of membrane, bubble point, porosity, water permeation, and highest blood plasma separation speed. The results are shown in Table 10.

TABLE 10

| | Liquid paraffin (part by weight) | Cooling liquid | Temperature of the cooling liquid (°C.) | Additive volume of crystalline seed forming agent (part by weight) | Membrane thickness ($\mu$m) | Bubble point (kgf/cm$^2$) | Porosity (%) | Volume of water Permeation (ml.min.mmHg.m$^2$) | Highest Plasma separation Speed (ml/min) |
|---|---|---|---|---|---|---|---|---|---|
| Example 3 | 400 | Polyethylene glycol | 35 | 0.3 | 146 | 1.1 | 66 | 162 | 40 |
| Example 4 | 400 | Polyethylene glycol | 20 | 0.3 | 140 | 1.1 | 65 | 158 | — |
| Example 5 | 456 | Polyethylene glycol | 35 | 0.3 | 143 | 0.9 | 68 | 229 | — |
| Control 5 | 400 | Liquid paraffin | 38 | 0.3 | 120 | 0.7 | 71 | 330 | 40 |

TABLE 10-continued

|  | Liquid paraffin (part by weight) | Cooling liquid | Temperature of the cooling liquid (°C.) | Additive volume of crystalline seed forming agent (part by weight) | Membrane thickness (μm) | Bubble point (kgf/cm²) | Porosity (%) | Volume of water Permeation (ml.min.mmHg.m²) | Highest Plasma separation Speed (ml/min) |
|---|---|---|---|---|---|---|---|---|---|
| Control 6 | 400 | 1,1,2-trichloro-1,2,2-trifluoro-ethane | 30 | 0.3 | 150 | 0.9 | 73 | 305 | 40 |
| Control 7 | 150 | Liquid paraffin | 30 | 0.3 | 120 | 3.1 | 55 | 90 | 40 |
| Control 8 | Cellulose Acetate Membrane | | | | 162 | 3.2 | 72 | 320 | 35 |

It is clearly noted from Table 10 that the flat-film type porous polypropylene membranes of the present invention (Examples 3 through 5) exhibited high porosity and water permeability and also possessed high blood plasma separation speed.

Further the flat-film type porous polypropylene membranes of this invention, owing to their membranous structure, suffered sparingly from occlusion of blood cells and they had an advantage of hardly admitting of hemolysis as shown in FIGS. 29 and 30. In contrast, the flat-film type porous polypropylene membranes of Controls 5 through 7 which used liquid paraffin or halogenated hydrocarbon as the cooling liquid were liable to induce hemolysis and consequently were not allowed to use any large intermembranous pressure, though they exhibited as high blood plasma operation speed as the flat-film type porous polypropylene membranes of the present invention. In terms of the permeability to the components of blood plasma, the flat-film type porous polypropylene membrane of this invention (Example 3) was favorably comparable with that of Control 1 which had a large surface pore diameter.

The various terms used in the present specification concerning the Flat-film type porous polypropylene membrane and the methods used for the determination of the properties mentioned herein are defined below.

Bubble point

This property was determined in accordance with the method of correction specified in ASTM F316, using a stainless steel holder 47 mm in diameter and isopropyl alcohol as a liquid alcohol. The pressure applied was continuously increased until a continuous line of nitrogen bubbles began to rise uniformly and incessantly from the center of the filter through the isopropyl alcohol. The pressure at this point was reported as bubble point.

Thickness of membrane

This property was determined by actually measuring the thickness of a given membrane with the aid of micrometer.

Porosity

A given flat-film type porous polypropylene membrane was immersed in ethanol and then hydrated by means of displacement of ethanol with water and the weight of the water (Wp) consequently contained therein was determined. The porosity was calculated in accordance with the following formula:

$$P = \frac{(W_p - W_w)}{(W_w/P) + (W_p - W_w)} \times 100$$

wherein Ww stands for the weight of the membrane in the dry state and P g/ml for the density of the polymer.

Water permeation

Water at 25° C. was caused to permeate a give membrane measuring $1.45 \times 10^{-3}$ m² in area under application of a pressure of 0.7 kgf/cm². The time required for 100 ml of water to pass through the membrane was clocked and reported as water permeation.

Highest blood plasma separation speed (Qf max)

Figure 24:
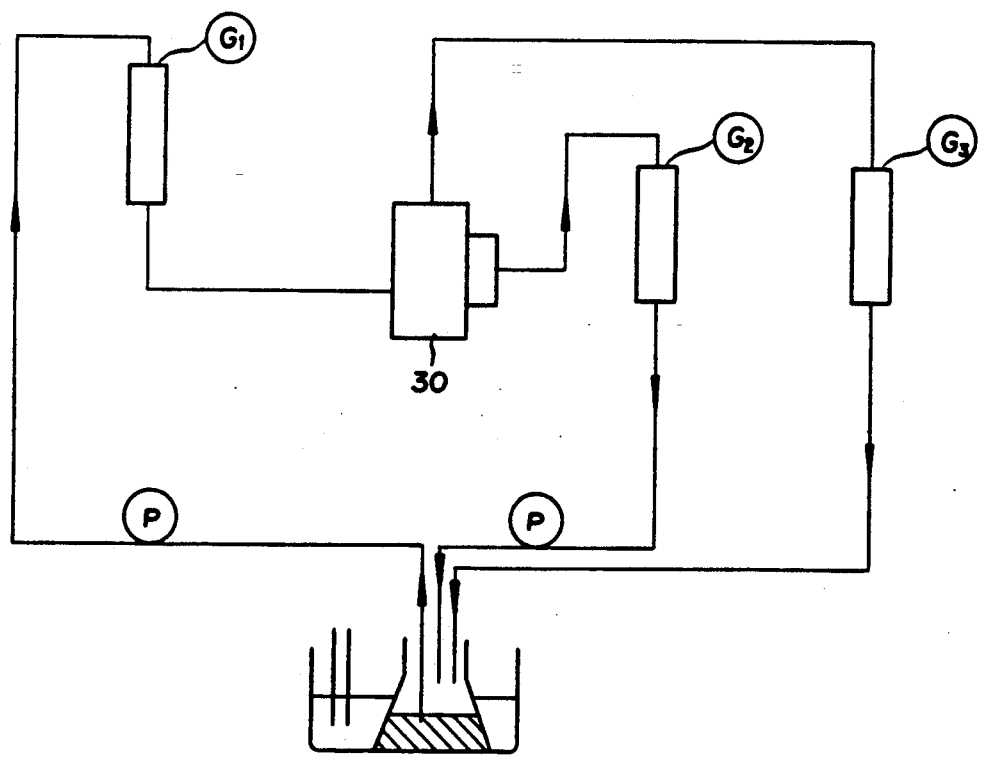
FIG. 24 is a circuit diagram for the measurement of the highest blood plasma separation speed.

This property was determined by use of a circuit illustrated in FIG. 24. In a module 30 possessing a membrane surface area of 0.4 m², fresh bovine blood incorporating therein heparin of a hematocrit value of 40% (5,000 U/liter) was circulated in a flow volume of 100ml/min at a pressure loss of 30 mmHg, with the flow volume of the filtration pump successively increased from 10 ml/min to 10, 15, 20, 25, 30, 40, and 42 at intervals of 30 minutes. The amount of filtrate immediately before the increase of T.M.P. within an interval of 30 minutes surpassed 20 mmHg was found and reported as Qf max.

Figure 2:
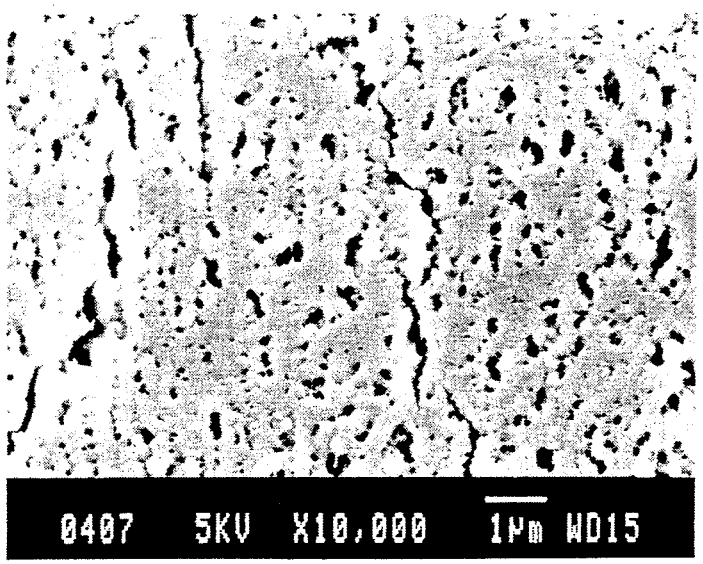
Figure 3:
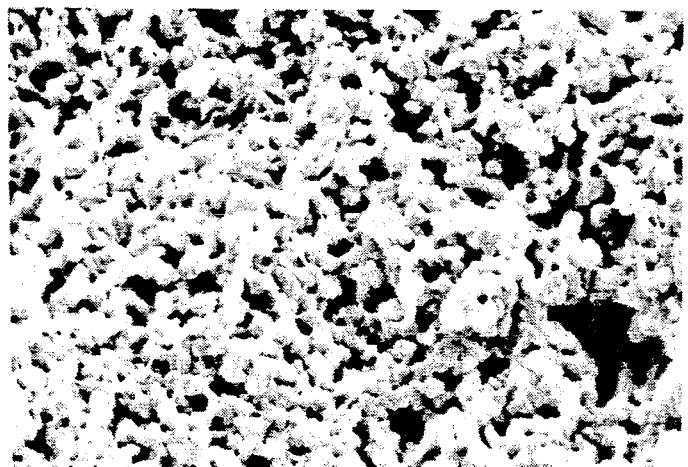

Here, $T.M.P. = P_{in} + P_{out}/2 - P_{fil}$ is presumed. In FIG. 2, G1, G2, and G3 each denote a pressure meter, the pressure of G1 is expressed as $P_{in}$, that of Ga as $P_{fil}$, and that of G3 as $P_{out}$ respectively, Every P indicated in the diagram stands for a pump.

Average pore diameter

This property was determined by actually measuring the size of pores in a given membrane with a mercury porosity.

Industrial Applicability

As described above, this invention concerns a porous polypropylene hollow fiber membrane wherein the solid phase in the inner surface region thereof is formed with particles of polypropylene closely fused and joined to give rise to a continuous phase while partially exposed through the surface thereof, the solid phase in the interior and the outer surface region thereof is formed with particles of polypropylene interconnected in the direction of axis of fiber to give rise to a multiplicity of lumps of polypropylene, and the interstices between these solid phases has continuous pores interconnected in the form of a three-dimensional network. When this porous polypropylene hollow fiber membrane is used in an artificial lung, therefore, it induces no leakage of blood plasma and yet retains a high gas-exchange capacity even during a protracted service and, without reference to the choice of the type of the artificial lung on account of the mode of circulation of blood either inside or outside the hollow fiber membrane, neither imparts any injury to blood cells nor aggravates pressure loss of the blood. Since the porous polypropylene hollow fiber membrane possesses a smooth outer surface, it proves to be highly advantageous in respect that it is free from various drawbacks otherwise incurred during the assembly of an artificial lung such as cohesion of adjacent hollow fiber membranes or impairment of the work of potting due to adhesive agent. These characteristic features are manifested all the more to advantage when the ratio of birefringence in the direction of axis thereof is in the range of 0.001 to 0.01, the porosity in the range of 10 to 60%, the opening ratio in the inner surface in the range of 10 to 30%, the oxygen gas flux in the range of 100 to 1,500 liters/min.m$^2$ atm, the inside diameter in the range of 150 to 300 μm, the wall thickness in the range of 10 to 150 μm, the average diameter of polypropylene particles in the range of 0.1 to 2.0 μm, and the average pore diameter in the inner surface in the range of 0.1 to 1.0 μm.

This invention further concerns a method for the production of a porous polypropylene hollow fiber membrane, which is characterized by mixing polypropylene, an organic filler uniformly dispersible in the polypropylene in a molten state and easily soluble in an extractant to be used later, and a crystalline seed forming agent, discharging the resultant mixture in a molten state through annular spinning orifices, cooling and solidifying the resultant hollow threads by contact with a cooling and solidifying liquid having no compatibility with the aforementioned organic filler and possessing a specific heat capacity in the range of 0.2 to 0.7 cal/g, and then bringing the cooled and solidified hollow threads into contact with an extractant incapable of dissolving polypropylene thereby removing the organic filler therefrom by extraction. While the spinning dope obtained by melting and uniformly dispersing the raw materials is cooled and solidified, therefore, the phase separation of the polypropylene and the organic filler in the spinning dope can be effected at a proper cooling speed without inducing any local presence of the organic filler in the outer surface part and, as the result, numerous micropores can be produced in the interstices of properly crystallized and grown particles of polypropylene and, moreover, the outer surface part as well as the thick wall part of the hollow fiber can form a solid phase having particles of polypropylene orderly arranged in the direction of axis of fiber and assume a smooth surface. As the result, there can be produced a hollow fiber membrane which exhibits the aforementioned outstanding properties stably and uniformly. By the method of this invention, the porous polypropylene hollow fiber membrane possessing still better properties can be obtained when a silicone oil or polyethylene glycol, preferably a silicone oil possessing a viscosity in the range of 2 to 50 cSt or a polyethylene glycol possessing an average molecular weight in the range of 100 to 400, is used as the cooling and solidifying liquid, liquid paraffin is used as the organic filler, the proportion of the organic filler to 100 parts by weight of polypropylene is in the range of 35 to 150 parts by weight, an organic heat-resistance substance possessing a melting point of not less than 150° C. and a gelling point of not less than the crystallization starting point of polypropylene is used as the crystalline seed forming agent, and the proportion of the crystalline seed forming agent to 100 parts by weight of polypropylene is in the range of 0.1 to 5 parts by weight.

This invention also concerns an artificial lung provided with a hollow fiber membrane as a gas-exchange membrane, characterized by the fact that the hollow fiber membrane is a porous polypropylene hollow fiber membrane wherein the solid phase in the inner surface region thereof is formed with particles of polypropylene closely fused and joined to give rise to a continuous phase while partially exposed through the surface thereof, the solid phase in the interior and the outer surface region thereof is formed with particles of polypropylene interconnected in the direction of axis of fiber to give rise to a multiplicity of lumps of polypropylene, and the interstices between these solid phases has continuous pores interconnected in the form of a three-dimensional network. In the artificial lung of either the type adapted to circulate the blood inside the hollow fiber membrane and blow the oxygen-containing gas outside the hollow fiber membrane or the type adapted to circulate the blood outside the hollow fiber membrane and blow the oxygen-containing gas inside the hollow fiber membrane, therefore, the ability of the membrane to add oxygen and the ability to remove carbon dioxide gas are not degraded even during a protracted service in the extra-corporeal circulation of blood, no leakage of blood or blood plasma is induced, and neither infliction of injury upon blood cells nor aggravation of pressure loss is entailed. Thus, the artificial lung deserves to be esteemed highly. Typically in 30 hours' extra-corporeal circulation of blood, the artificial lung of the present invention incurs neither leakage of blood plasma nor degradation of gas-exchange capacity. The properties of the artificial lung are manifested more to advantage when the ratio of birefringence in the direction of axis of fiber is in the range of 0.001 to 0.01, the porosity in the range of 10 to 60%, the opening ratio in the inner surface in the range of 10 to 30%, the oxygen gas flux in the range of 10 to 1,500 liters/min.m$^2$.atm., and inside diameter in the range of 150 to 300 μm, the wall thickness in the range of 10 to 100 μm, the average diameter of polypropylene particles in the range of 0.1 to 2.0 μm, and the average pore diameter in the inner surface in the range of 0.1 to 1.0 μm.

Further, this invention concerns a flat-film type porous polypropylene membrane possessing a microreticular structure, characterized by the fact that either or both of the opposite surface region of the porous membrane form a surface layer possessing an average pore diameter in the range of 0.1 to 5.0 μm, a bubble point of not more than 2.0 kgf/cm$^2$, a porosity in the range of 60 to 85%, and a water permeability of not less than 100 ml/min.mmHg.m$^2$, and the membrane possesses a wall thickness in the range of 30 to 300μm. Thus, the flat-film type porous polypropylene membrane exhibits high porosity and water permeability. When it is used for blood plasma separation, it suffers sparingly from clogging of pores with proteins or blood cells, effects separation of blood plasma at a high speed, and entails only slight occlusion of blood cells and hardly includes hemolysis. Owing to these features, the flat-film type porous polypropylene membrane is used advantageously for blood plasma separation, i.e. the separation of blood into blood cells and blood plasma.. It is particularly useful as a membrane for blood plasma separation where the separated blood plasma is put to use as in donorpheresis. The flat-film type porous polypropylene membrane of this invention is enabled to manifest these highly desirable properties still more to advantage when the bubble point is not more than 1.8 kgf/cm², the water permeation not less than 140ml/min.mmHg.m², and the ratio of shrinkage due to 120 minutes' heat treatment at 121° C. is not more than 6.0%.

This invention also concerns a method for the production of a flat-film type porous polypropylene membrane, characterized by mixing 100 parts by weight of polypropylene, 200 to 600 parts by weight of an organic filler uniformly dispersible in the polypropylene in the molten state, and 0.1 to 5.0 parts by weight of a crystalline seed forming agent, discharging the resultant mixture in a molten state through a die thereby producing a molten membrane in the form of a flat film, cooling and solidifying liquid exhibiting no compatibility to the organic filler and possessing a specific heat capacity in the range of 0.2 to 0.7 cal/g, and then bringing the cooled and solidified membrane into contact with an extractant incapable of dissolving the polypropylene and capable of dissolving the organic filler thereby removing the organic filler from the membrane by extraction. This method is capable of easily producing the flat-film type porous polypropylene membrane possessing the aforementioned outstanding properties. The properties of the flat-film type porous polypropylene membrane are stabilized to a great extent when the method described above further comprises causing the flat-film type porous polypropylene membrane which results from the removal of the organic filler by extraction to be fixed in a prescribed length and subjected to a heat treatment at a temperature in the range of 110° to 140° C. The flat-film type porous polypropylene membrane of high grade can be obtained easily when the contact of the molten membrane with the cooling and solidifying liquid is effected by having a guide roller disposed in the cooling and solidifying liquid, discharging the molten mixture onto the guide roller, and causing the molten mixture to be led into the cooling and solidifying liquid by the rotation of the guide roller. The properties of the flat-film type porous polypropylene membrane are further enhanced when the cooling and solidifying liquid is a polyether, the polypropylene consists of a species of polypropylene possessing a melt index in the range of 5 to 40 and 0 to 50% by weight of another species of polypropylene possessing a melt index in the range of 0.05 to 5, the crystalline seed forming agent is incorporated in the mixture in a proportion falling in the range of 0.2 to 1.0 part by eight, the crystalline seed forming agent is an organic heat-resistant substance possessing a melting point of not less than 150° C. and a gelling point not less than the crystallization starting point of polypropylene, and the extractant is either a halogenated hydrocarbon or a mixture of a halogenated hydrocarbon with a ketone.

We claim:

1. A method for the production of a porous polypropylene hollow fiber membrane, comprising:
   mixing polypropylene, an organic filler, and a crystalline seed forming agent to form a resultant mixture wherein said organic filler is uniformly dispersed in said polypropylene in a molten state and readily soluble in an extractant,
   discharging the resultant mixture in a molten state through annular spinning orifices,
   cooling and solidifying the resultant hollow threads by contact with a cooling and solidifying liquid having no compatibility with said organic filler and possessing a specific heat capacity in the range of 0.2 to 0.7 cal/g, wherein the cooling and solidifying liquid is silicone oil or polyethylene glycol, and
   bringing the cooled and solidified hollow threads into contact with an extractant incapable of dissolving polypropylene, thereby removing said organic filler therefrom by extraction.

2. A method according to claim 1, wherein liquid paraffin is used as the organic filler.

3. A method according to claim 1, wherein the proportion of said organic filler to 100 parts by weight of said polypropylene is in the range of 35 to 150 parts by weight.

4. A method according to claim 1, wherein said crystalline seed forming agent is an organic heat-resistant substance possessing a melting point of not less tan 150° C. and a gelling point of not less than the crystallization starting point of the polypropylene being used.

5. A method according to claim 1, wherein the proportion of said crystalline seed forming agent to 100 parts by weight of said polypropylene is in the range of 0.1 to 5 parts by weight.

6. A method according to claim 1, wherein said silicone oil possesses a viscosity in the range of 2 to 50 centistokes at 20° C.

* * * * *

UNITED STATES PATENT AND TRADEMARK OFFICE
CERTIFICATE OF CORRECTION

PATENT NO. : 5,139,529

DATED : August 18, 1992

INVENTOR(S) : Yukio SEITA et al

It is certified that error appears in the above-identified patent and that said Letters Patent is hereby corrected as shown below:

On the title page: Item
    [54], delete "METHODS" and insert -- METHOD --.

Signed and Sealed this

Twenty-fourth Day of August, 1993

Attest:

Attesting Officer

BRUCE LEHMAN

Commissioner of Patents and Trademarks